US012779986B2

(12) United States Patent
Tani et al.

(10) Patent No.: US 12,779,986 B2
(45) Date of Patent: Nov. 3, 2026

(54) FUEL LID OPENER

(71) Applicant: NHK SPRING CO., LTD., Yokohama (JP)

(72) Inventors: Yoshihisa Tani, Ina (JP); Akinori Sasaki, Ina (JP); Ken Toriyama, Ina (JP)

(73) Assignee: NHK SPRING CO., LTD., Yokohama (JP)

( * ) Notice: Subject to any disclaimer, the term of this patent is extended or adjusted under 35 U.S.C. 154(b) by 501 days.

(21) Appl. No.: 18/255,580

(22) PCT Filed: Dec. 6, 2021

(86) PCT No.: PCT/JP2021/044769

§ 371 (c)(1),
(2) Date: Jun. 1, 2023

(87) PCT Pub. No.: WO2022/124272

PCT Pub. Date: Jun. 16, 2022

(65) Prior Publication Data

US 2024/0001760 A1 Jan. 4, 2024

(30) Foreign Application Priority Data

Dec. 7, 2020 (JP) ................................ 2020-202902

(51) Int. Cl.
*B60K 15/05* (2006.01)
*E05B 43/00* (2006.01)
(Continued)

(52) U.S. Cl.
CPC ............ *B60K 15/05* (2013.01); *E05B 43/005* (2013.01); *E05B 81/64* (2013.01); *E05B 83/34* (2013.01);
(Continued)

(58) Field of Classification Search
CPC .... B60K 2015/0538; B60K 2015/0505; B60K 2015/0515; B60K 2015/0576; B60K 2015/0584; B60K 2015/0582
(Continued)

(56) References Cited

U.S. PATENT DOCUMENTS 5,076,622 A * 12/1991 Detweiler ............... E05B 79/20
292/DIG. 60
7,185,938 B2 * 3/2007 Beck ...................... B60K 15/05
292/207

(Continued)

FOREIGN PATENT DOCUMENTS

DE 102011012699 A1 9/2012
JP 2016223256 A * 12/2016

(Continued)

OTHER PUBLICATIONS

Translation of JP 2020037792 (Year: 2020).*

(Continued)

*Primary Examiner* — Amy R Weisberg
*Assistant Examiner* — Veronica M Condo
(74) *Attorney, Agent, or Firm* — Knobbe, Martens, Olson & Bear, LLP

(57) ABSTRACT

When a fuel lid goes from an open state to a closed state and a pressed state and then returns to the closed state, a contact/non-contact switching mechanism switches a signal outputted from a microswitch from an ON signal to an OFF signal by performing a first operation. When the fuel lid goes from the closed state to the pressed state and then returns to the closed state, the contact/non-contact switching mechanism switches the signal outputted from the microswitch from the OFF signal to the ON signal and the OFF signal in that order by performing a second operation. Under a condition at least of the signal outputted from the micro- (Continued)

switch switching from the OFF signal to the ON signal and the OFF signal in that order within a prescribed time, a control unit controls a lifter to rotate to another side around an axis line.

9 Claims, 16 Drawing Sheets

(51) Int. Cl.
*E05B 81/64* (2014.01)
*E05B 83/34* (2014.01)
*E05C 3/12* (2006.01)

(52) U.S. Cl.
CPC .......... *E05C 3/12* (2013.01); *B60K 2015/053* (2013.01); *B60K 2015/0561* (2013.01); *E05Y 2201/484* (2013.01)

(58) Field of Classification Search
USPC ........................................................ 296/97.22
See application file for complete search history.

(56) References Cited

U.S. PATENT DOCUMENTS

| | | | | |
|---|---|---|---|---|
| 10,006,230 | B2 * | 6/2018 | Nam | B60K 15/05 |
| 10,011,170 | B2 * | 7/2018 | Horikawa | E05B 81/40 |
| 10,704,303 | B2 * | 7/2020 | Stack | E05C 19/022 |
| 10,730,386 | B2 * | 8/2020 | Persiani | B60K 15/05 |
| 11,162,283 | B2 * | 11/2021 | Sakurai | E05B 77/34 |
| 11,673,466 | B2 * | 6/2023 | Sha | E05B 81/36 49/281 |
| 11,872,877 | B2 * | 1/2024 | Tani | E05B 47/0046 |
| 12,304,300 | B2 * | 5/2025 | Xiao | E05C 19/02 |
| 2021/0156177 | A1 * | 5/2021 | Noda | E05B 63/22 |
| 2021/0206258 | A1 | 7/2021 | Tani et al. | |
| 2021/0237560 | A1 | 8/2021 | Tani et al. | |

FOREIGN PATENT DOCUMENTS

| | | | | | |
|---|---|---|---|---|---|
| JP | 2020037792 | A * | 3/2020 | | |
| JP | 2020037793 | A * | 3/2020 | | |
| JP | 2020-070564 | A | 5/2020 | | |
| WO | 2019/230924 | A1 | 12/2019 | | |
| WO | WO-2020090235 | A1 * | 5/2020 | | E05B 81/06 |

OTHER PUBLICATIONS

Translation of JP 2020037793 (Year: 2020).*
Translation of JP 2016223256 (Year: 2016).*
International Search Report issued in the corresponding International Patent Application No. PCT/JP2021/044769, dated Jan. 11, 2022 in 4 pages including English translation.
Written Opinion issued in the corresponding International Patent Application No. PCT/JP2021/044769, dated Jan. 11, 2022 in 3 pages.

* cited by examiner

FUEL LID OPENER

CROSS-REFERENCE TO RELATED APPLICATIONS

This application is the U.S. National Phase under 35 U.S.C. § 371 of International Application PCT/JP2021/044769, filed Dec. 6, 2021, which claims priority to Japanese Patent Application No. 2020-202902, filed Dec. 7, 2020. The disclosures of the above-described applications are hereby incorporated by reference in their entirety.

TECHNICAL FIELD

The present invention relates to a fuel lid opener that pushes a fuel lid of a vehicle open in response to a push operation.

BACKGROUND ART

Mechanisms are known that open, close, lock and unlock fuel lids (below referred to as lids where appropriate). For example, in a mechanism disclosed in German Patent Application Publication No. 102011012699A1, for locking and unlocking of a lid, a locking member can be moved to a locking position by returning means. A motor and gearwheel inside a housing are used to rotate the locking member to unlock the lid. Then the unlocked lid is automatically opened up by a rotary spring incorporated at a hinge arm.

A locking mechanism of the conventional technology mentioned above is provided with switching means that switches a switching signal in response to a press of the lid. A control device performs processing in accordance with the switching of the switching signal in response to the pressing of the lid, and the control device may selectively operate and stop a motor that is coupled to the switching means. Actuating means for actuating the switching means may be connected to the lid. The actuating means may operate the switching means when a pressing tierce acts from outside the lid and may stop the switching means when the pressing force is removed.

The control device mentioned above compares a measured value of a duration for which an external force is applied to the actuating means with a first reference duration memorized at the control device. The control device operates the motor and releases the lid when the switching means is operated for at least the first reference duration. After the lid has been closed, the control device compares a measured value of a closed duration with a second reference duration, which is a minimum time for which the lid must be closed before the lid can be opened again. The control device may allow the lid to be released only when the measured value of the closed duration is at least the second reference duration.

To describe this further, in the conventional technology described above, when the lid is pushed in from a lid open state to an end stopper, the switching signal initially switches from active to inactive and an actual closed duration is measured. If the switching signal switches back from inactive to active while this duration is less than the second reference duration, the closed duration measured by the control device is reset. When a hand is removed from the lid, the switching signal again switches from active to inactive, an actual duration from the reset state is measured again, and the lid may be opened again when this duration exceeds the second reference duration.

SUMMARY OF INVENTION

Technical Problem

However, in the conventional technology described above, if the lid is pushed in slowly, the duration from when the switching signal initially switches from active to inactive may exceed the second reference duration, in which case the measured closed duration is not reset. In this situation, the switching signal then switches from inactive to active when the lid is pushed in to the end stopper. If the hand is removed from the lid slowly after this state has continued for the first reference duration or more, the motor may be operated under the control of the control device and the lid may not be closed.

The present disclosure provides a fuel lid opener that may prevent misoperation when a fuel lid is push-operated from an open state slowly.

Solution to Problem

A fuel lid opener according to a first aspect of the present disclosure includes: a case attached to an outer periphery face of a side wall of a lid box, at which lid box a fuel lid is rotatably supported for opening and closing; a lifter that is supported at the case to be rotatable around an axis line along a plate surface direction of the fuel lid in a closed state thereof, the lifter including an arm portion that extends in a rotation radius direction within the lid box and, when an outer face side of the fuel lid is push-operated, the arm portion receiving a force that causes the lifter to rotate to one side around the axis line; a push lifter mechanism provided in the case and including an urging member that urges the lifter to another side around the axis line, when the fuel lid is in a pressed state that is pushed in further than the closed state, the urging member urging such that the fuel lid returns to a position thereof in the closed state, and when a driving unit operates, the push lifter mechanism causing the lifter to rotate to the other side around the axis line and pushing the fuel lid to open; a contact/non-contact switching mechanism that is provided at the push lifter mechanism and is operated to move in and out of contact with an actuated portion of a switch portion by rotation of the lifter, the contact/non-contact switching mechanism being structured so as to, when the fuel lid goes from an open state to the closed state and the pressed state and then returns to the closed state, switch a signal outputted from the switch portion from a first signal to a second signal by performing a prescribed first operation, and the contact/non-contact switching mechanism being structured so as to, when the fuel lid goes from the closed state to the pressed state and then returns to the closed state, switch the signal outputted from the switch portion from the second signal to the first signal and the second signal in that order by performing a prescribed second operation that is different from the first operation; and a control unit that, consequent to a condition at least of the signal outputted from the switch portion switching from the second signal to the first signal and the second signal in that order within a prescribed time, causes the driving unit to operate so as to rotate the lifter to the other side around the axis line. The "prescribed time" referred to herein is specified as appropriate on the basis of durations in which the fuel lid returns to the closed state from the closed state via the pressed state.

According to the structure described above, the fuel lid is supported at the lid box to be rotatable for opening and closing, and the case is attached to the outer periphery face of the side wall of the lid box. The lifter is supported at the case to be rotatable around the axis line that runs along the plate surface direction of the fuel lid in the closed state. The arm portion of the lifter extends in a rotation radius direction in the lid box, and receives a force that rotates the arm portion to the one side around the axis line when the outer face side of the fuel lid is push-operated. The push lifter mechanism is provided in the case. The urging member of the push lifter mechanism urges the lifter to the other side around the axis line. In addition, when the fuel lid is in the pressed state, being pushed in further than the closed state, the urging member urges the lifter to return to the position thereof at the closed state. When the driving unit operates, the push lifter mechanism rotates the lifter to the other side around the axis line and pushes the fuel lid to open.

The contact/non-contact switching mechanism is provided at the push lifter mechanism. The contact/non-contact switching mechanism is operated and moves in and out of contact with the actuated portion of the switch portion by rotation of the lifter. This contact/non-contact switching mechanism is structured such that when the fuel lid goes from the open state to the closed state and the pressed state and then returns to the closed state, the contact/non-contact switching mechanism switches the signal outputted from the switch portion from the first signal to the second signal by performing the prescribed first operation. The contact/non-contact switching mechanism is also structured such that when the fuel lid goes from the closed state to the pressed state and then returns to the closed state, the contact/non-contact switching mechanism switches the signal outputted from the switch portion from the second signal to the first signal and then to the second signal by performing the prescribed second operation that is different from the first operation. In response to the condition at least of the signal outputted from the switch portion switching from the second signal to the first signal and then to the second signal in that order within the prescribed time, the control unit operates the driving unit so as to rotate the lifter to the other side around the axis line. Thus, even if the fuel lid is push-operated from the open state slowly, misoperation may be prevented.

In a fuel lid opener according to a second aspect of the present disclosure, in the structure of the first aspect, the switch portion is structured by a single microswitch disposed in a fixed state within the case, and the switch portion is structured such that a relative movement path of the actuated portion of the microswitch with respect to the contact/non-contact switching mechanism is different when the contact/non-contact switching mechanism performs the first operation and when the contact/non-contact switching mechanism performs the second operation.

According to the structure described above, the switch portion is structured by the single microswitch that is disposed in the case in a fixed state. Relative movement paths of the actuated portion of the microswitch with respect to the contact/non-contact switching mechanism are different when the contact/non-contact switching mechanism performs the first operation and when the contact/non-contact switching mechanism performs the second operation. Therefore, signals may be outputted appropriately without plural switches being provided.

In a fuel lid opener according to a third aspect of the present disclosure, in the structure of the first aspect or the second aspect, the push lifter mechanism includes: a cam slot provided in the case, a depth direction of the cam slot being a direction along the direction of the axis line; a first link attached to the lifter; and a second link that is coupled to be rotatable relative to the first link around an axis parallel to the axis line, the second link including an actuation pressing portion in a flat surface shape, the actuation pressing portion pressing the actuated portion of the switch portion when the fuel lid is in the closed state, and a guided portion that is inserted into the cam slot and is movable along the cam slot.

According to the structure described above, the push lifter mechanism includes the cam slot, the first link and the second link. The cam slot is provided in the case with the depth direction of the cam slot along the axis line direction, and the first link is attached to the lifter. The second link is coupled to the first link to be rotatable around an axis parallel to the axis line. The second link is provided with the actuation pressing portion and the guided portion. The actuation pressing portion is formed in a flat surface shape and presses the actuated portion of the switch portion when the fuel lid is in the closed state. The guided portion is inserted into the cam slot and is movable along the cam slot. Thus, pressing of the actuated portion of the switch portion is controlled by the second link being guided by and moving in the cam slot.

In a fuel lid opener according to a fourth aspect of the present disclosure, in the structure of the third aspect, the push lifter mechanism is structured such that, when the push lifter mechanism pushes the fuel lid to open, the guided portion is disengaged by driving tierce of the driving unit from a position at which movement by urging force of the urging member is disabled, and the lifter is rotated to the other side around the axis line by the urging force of the urging member.

According to the structure described above, when the push lifter mechanism is to push the fuel lid open, the guided portion is at the position at which movement of the guided portion by the urging force of the urging member is disabled, and the guided portion is disengaged from this position by the driving fierce of the driving unit. Hence, the lifter is turned to the other side around the axis line by the urging force of the urging member. Thus, the driving force of the driving member and the urging force of the urging member may be utilized to put the fuel lid into the open state.

In a fuel lid opener according to a fifth aspect of the present disclosure, in the structure of the third aspect or the fourth aspect, the second link further includes: a first angled surface that is continuous with the actuation pressing portion and is formed so as to be angled up toward a side thereof at which the actuation pressing portion is formed, the first angled surface being specified so as to press the actuated portion of the switch portion steadily in a final stage of the first operation of the contact/non-contact switching mechanism and a second angled surface that is provided separately from the first angled surface, is continuous with the actuation pressing portion and is formed so as to be angled up toward the side thereof at which the actuation portion is formed, the second angled surface being specified so as to press the actuated portion of the switch portion steadily in a final stage of the second operation of the contact/non-contact switching mechanism.

According to the structure described above, the first angled surface of the second link is continuous with the actuation pressing portion and is formed so as to be angled up toward the side thereof at which the actuation pressing portion is formed. The first angled surface steadily presses the actuated portion of the switch portion in the final stage of the first operation of the contact/non-contact switching mechanism. Therefore, even with a relatively simple structure, the signal that is outputted from the switch portion can be switched stably in the final stage of the first operation of the contact/non-contact switching mechanism. The second angled surface of the second link is provided separately from the first angled surface, is continuous with the actuation pressing portion and is formed so as to be angled up toward the side thereof at which the actuation pressing portion is formed. The second angled surface steadily presses the actuated portion of the switch portion in the final stage of the second operation of the contact/non-contact switching mechanism. Therefore, even with a relatively simple structure, the signal that is outputted from the switch portion can be switched stably in the final stage of the second operation of the contact/non-contact switching mechanism.

In a fuel lid opener according to a sixth aspect of the present disclosure, in the structure of any one of the third to fifth aspects: the cam slot includes a catch surface in a non recessed shape, the catch surface touching the guided portion at one side in a direction orthogonal to the axis line when the actuated portion of the switch portion is pressed by the actuation pressing portion; the driving unit includes a drive source and a moving body that, when the actuated portion of the switch portion is pressed by the actuation pressing portion, is movable between a restricting position and a restriction release position, the restricting position being a position at which the moving body restricts operation of the second link, the restriction release position being a position at which this restriction is released, and the moving body being moved from the restricting position to the restriction release position by operation of the drive source; and the moving body includes: a stopper portion, when the moving body is disposed at the restricting position and restricts operation of the second link, the stopper portion being disposed at one side of the guided portion in a direction orthogonal to the side of the guided portion at which the catch surface is disposed as seen in a direction along the axis line and the stopper portion restricting movement of the guided portion, and when the moving body is disposed at the restriction release position, the stopper portion being disposed at a position at which contact thereof with the guided portion is disabled; and a push-out portion that, when the moving body moves from the restricting position to the restriction release position, pushes out the second link such that the guided portion separates from the catch surface of the cam slot.

According to the structure described above, when the actuated portion of the switch portion is pressed by the actuation pressing portion, the non-recessed catch surface of the cam slot touches against the guided portion at the one side in the direction orthogonal to the axis line. The moving body of the driving portion is movable between the restricting position and the restriction release position when the actuated portion of the switch portion is pressed by the actuation pressing portion. The restricting position is the position of the moving body that restricts operation of the second link, and the moving body at the restriction release position releases the restriction. The moving body is moved from the restricting position to the restriction release position by operation of the drive source. When the moving body is disposed at the restricting position and restricts operation of the second link, seen in the direction along the axis line, the stopper portion of the moving body is disposed at the one side of the guided portion in the directional orthogonal to the side thereof at which the catch surface is disposed, and the stopper portion restricts movement of the guided portion. When the moving body is disposed at the restriction release position, the stopper portion is disposed at a position at which contact with the guided portion is disabled. When the moving body moves from the restricting position to the restriction release position, the push-out portion of the moving body pushes out the second link such that the guided portion separates from the catch surface of the cam slot.

Thus, when the fuel lid is in the closed state and the actuated portion of the switch portion is pressed by the actuation pressing portion, movement of the guided portion may be securely restricted by the catch surface and the stopper portion, and when the moving body is moved from the restricting position to the restriction release position by the driving force of the drive source, the guided portion may be separated from the catch surface of the cam slot easily.

In a fuel lid opener according to a seventh aspect of the present disclosure, in the structure of any one of the first to sixth aspects, the control unit causes the driving unit to operate such that the lifter is rotated to the other side when the signal outputted from the switch portion switches from the second signal to the first signal and the second signal in that order within the prescribed time and the control unit determines that the initial second signal was outputted continuously for at least a reference time specified in advance.

In the fuel lid opener of the present disclosure, the driving unit is operated at a moment at which the fuel lid has gone from the closed state to the pressed state and returned to the closed state and the signal outputted from the switch portion has become the second signal. The signal outputted from the switch portion promptly switches from the second signal to the first signal after the operation of the driving unit. Therefore, even though control is performed by reference to a continuous output time of the second signal, misoperation may be prevented.

DETAILED DESCRIPTION

Figure 1:
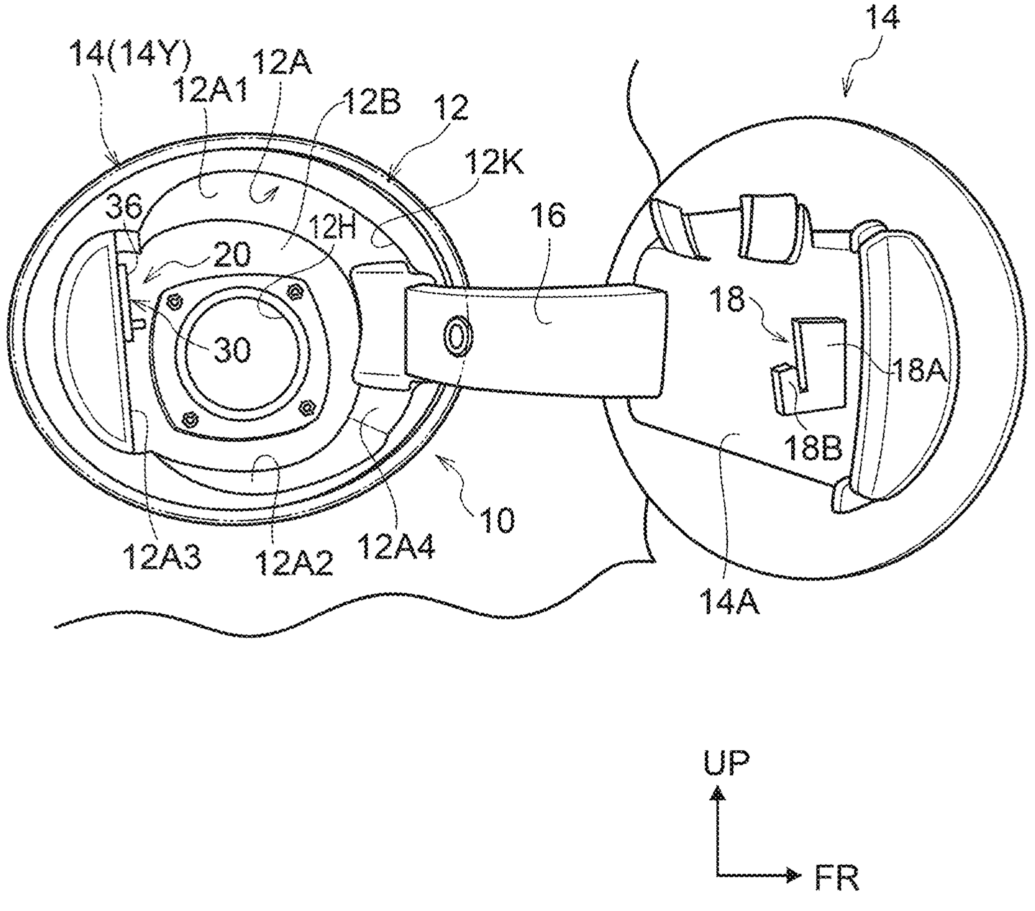
FIG. 1 is an elevation view showing a fuel lid assembly including a fuel lid opener according to an exemplary embodiment of the present disclosure, which is a view showing an open state of a fuel lid.

A fuel lid opener 20 according to an exemplary embodiment of the present disclosure is described using FIG. 1 to FIG. 16. For convenience of description, the arrows FR, UP and LH that are marked where appropriate in the drawings represent, respectively, a front direction, an upper direction and a left direction (a vehicle width direction inner side) of a vehicle at which the fuel lid opener 20 is provided. Below, where descriptions are given simply using directions to front and rear, left and right, and up and down, unless particularly specified, these refer to front and rear in the vehicle front-and-rear direction, left and right in the vehicle left-and-right direction, and up and down in the vehicle vertical direction. In the drawings, some reference symbols may be omitted with a view to simplification of the drawings.

Structure of the Exemplary Embodiment

As shown in FIG. 1, the fuel lid opener 20 according to the present exemplary embodiment is a structural element of a fuel lid assembly 10. The fuel lid assembly 10 is attached to a right side portion (for example, a quarter panel) of a vehicle such as a car or the like. The fuel lid assembly 10 structures a portion of a fueling apparatus. The fuel lid assembly 10 is provided with a lid box 12, a fuel lid 14 that is rotatable supported at the lid box 12 to be openable and closable, and the fuel lid opener 20, which is attached to the lid box 12. If the fuel lid assembly 10 is attached to a left side portion of a vehicle, the fuel lid assembly 10 has a structure with left-and-right symmetry relative to the present exemplary embodiment.

The lid box 12 is formed of, for example, metal plate, and is formed in a box shape of which the vehicle width direction outer side (the vehicle right side in this exemplary embodiment) is open. The lid box 12 includes a side wall 12A and a floor wall 12B. The side wall 12A is structured by an upper wall 12A1, a lower wall 12A2, a rear wall 12A3 and a front wall 12A4. A fueling port 12H is formed in the floor wall 12B. A structure to which a fueling pipe, which is not shown in the drawings, is connected is formed at the fueling port 12H. The vehicle according to the present exemplary embodiment is a gasoline car or a diesel car, but if the vehicle is a fuel cell vehicle, a hydrogen fueling port is connected to the lid box 12, and if the vehicle is an electric car, a charging port is connected to the lid box 12.

The fuel lid 14 is formed, for example, in a circular plate shape of metal plate. A hinge portion 16 projects from a portion of an outer periphery of the fuel lid 14. The hinge portion 16 is rotatable attached to a front end portion of the lid box 12 via a hinge pin, which is not shown in the drawings, whose axial direction is in the vehicle vertical direction. The fuel lid 14 is rotatable relative to the lid box 12 between an open position (the position illustrated in FIG. 1), at which the fuel lid 14 opens up an opening portion 12K of the lid box 12, and a closed position 14Y (illustrated by imaginary lines (two-dot chain lines) in the drawing), at which the fuel lid 14 closes off the opening portion 12K of the lid box 12. In a state in which the fuel lid 14 is disposed at the closed position 14Y (a closed state), the hinge portion 16 is disposed at a front end portion of the fuel lid 14.

A lifter engaging portion 18 is provided in a region close to an end portion of the fuel lid 14 at the opposite side of the fuel lid 14 from the side at which the hinge portion 16 is provided, that is, in a region close to a rear end portion of the fuel lid 14 in the closed state. The lifter engaging portion 18 is formed of, for example, metal plate and is fixed to a rear face 14A of the fuel lid 14 by means such as adhesive or the like. The lifter engaging portion 18 protrudes from the rear face 14A of the fuel lid 14 in a plate thickness direction of the fuel lid 14. The lifter engaging portion 18 is integrally provided with a pushing portion 18A and an "L"-shaped engaged portion 18B. The pushing portion 18A projects in a substantially rectangular shape from a proximal end portion of the lifter engagement portion 18. The engaged portion 18B projects so as to extend from a lower end portion of a distal end side of the pushing portion 18A and is inflected to the upper side. The lifter engaging portion 18 is provided so as to correspond with a lifter 30 (described in detail below) of the fuel lid opener 20.

Figure 2:
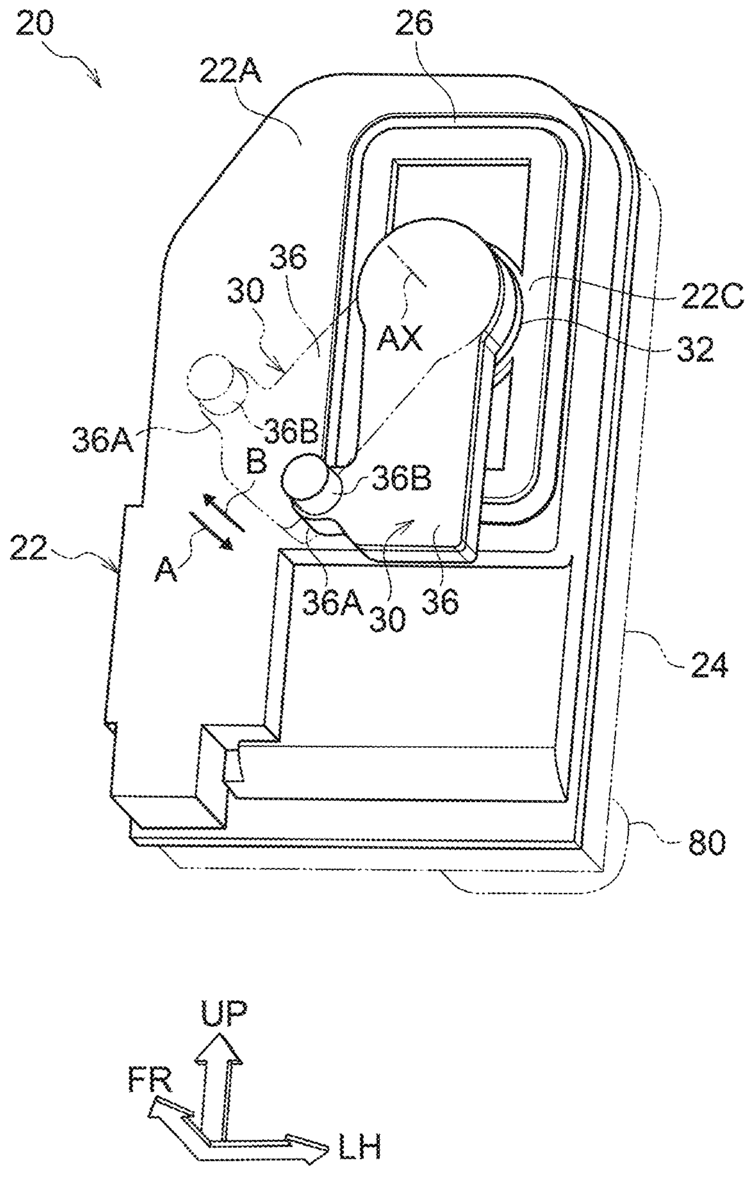
FIG. 2 is a perspective view showing the fuel lid opener in a state seen from a side at which an arm portion of a lifter is disposed.
Figure 3:
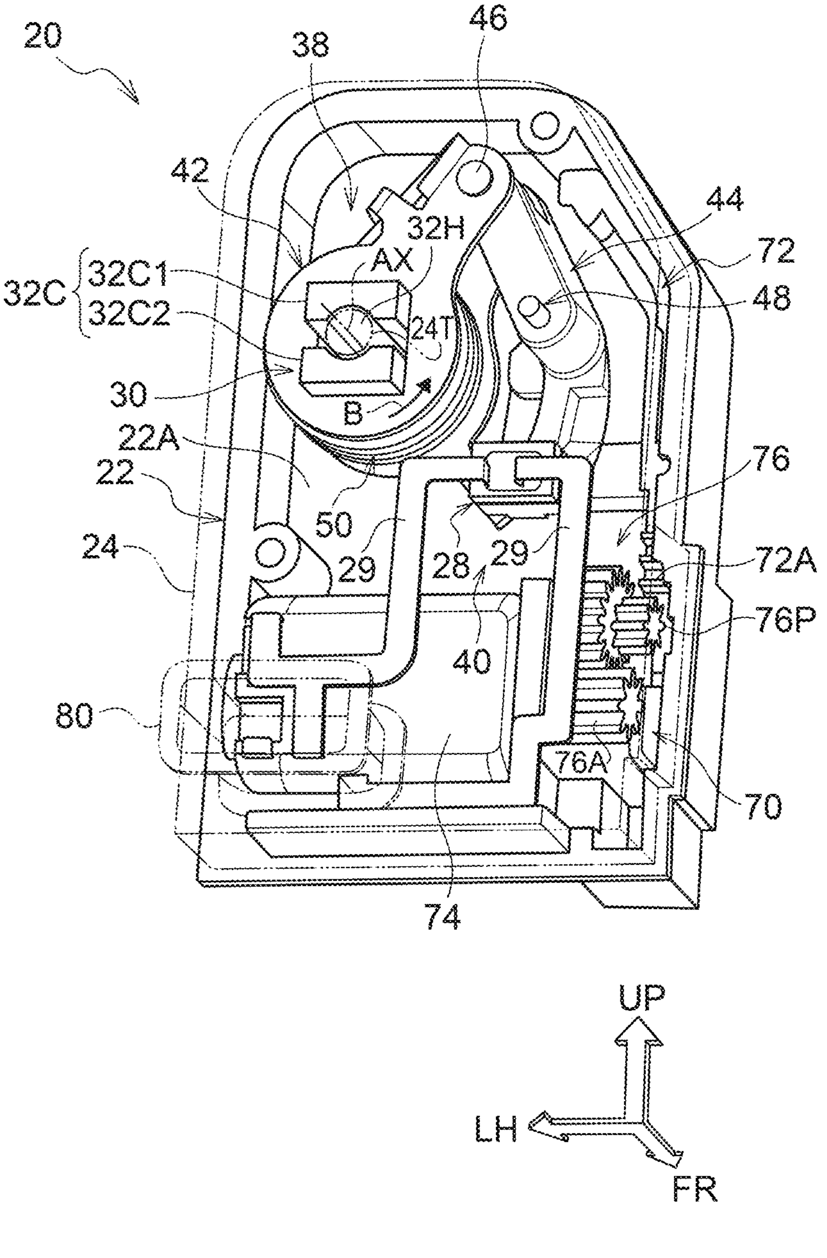
FIG. 3 is a perspective view showing the fuel lid opener in a state seen from the opposite side from FIG. 2.

The fuel lid opener 20 is provided with a case 22 and a cover 24, which are shown in FIG. 2 and FIG. 3, and includes the lifter 30 shown in FIG. 2 and a push lifter mechanism 38 shown in FIG. 3. To facilitate understanding of the drawings, only outlines of the cover 24 are shown, as two-dot chain lines. FIG. 3 shows the case 22 and push lifter mechanism 38, with the cover 24 in a transparent condition. The case 22 is formed of, for example, synthetic resin and is formed in a shallow-bottomed box shape. The case 22 is attached by fixing means such as screw-fixing or the like to an outer periphery face of the side wall 12A of the lid box 12 shown in FIG. 1 (to the rear face of the rear wall 12A3 in this exemplary embodiment). The case 22 shown in FIG. 2 and FIG. 3 is open to the vehicle rear side. An opening portion of the case 22 is closed off by the cover 24. The cover 24 is formed, for example, in a plate shape of synthetic resin, and is attached to the case 22 by means such as pawl-fitting or the like.

Figure 7A:
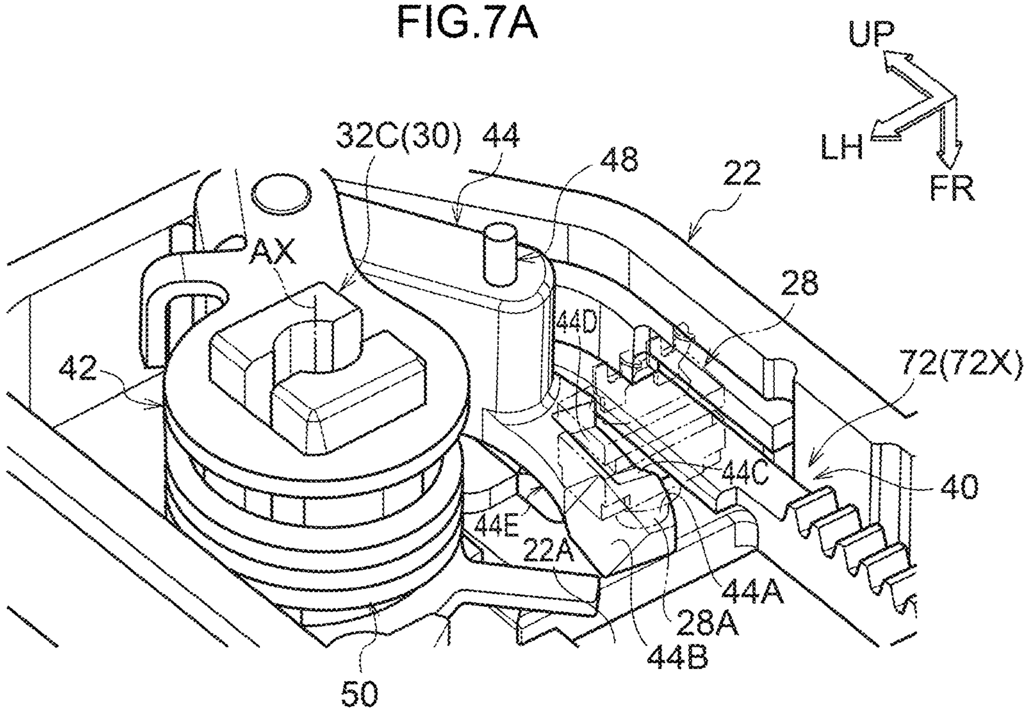
FIG. 7A is a perspective view showing a portion of the fuel lid opener of FIG. 3 in a state in which a microswitch is pressed, seen in the same direction as FIG. 6A.
Figure 7B:
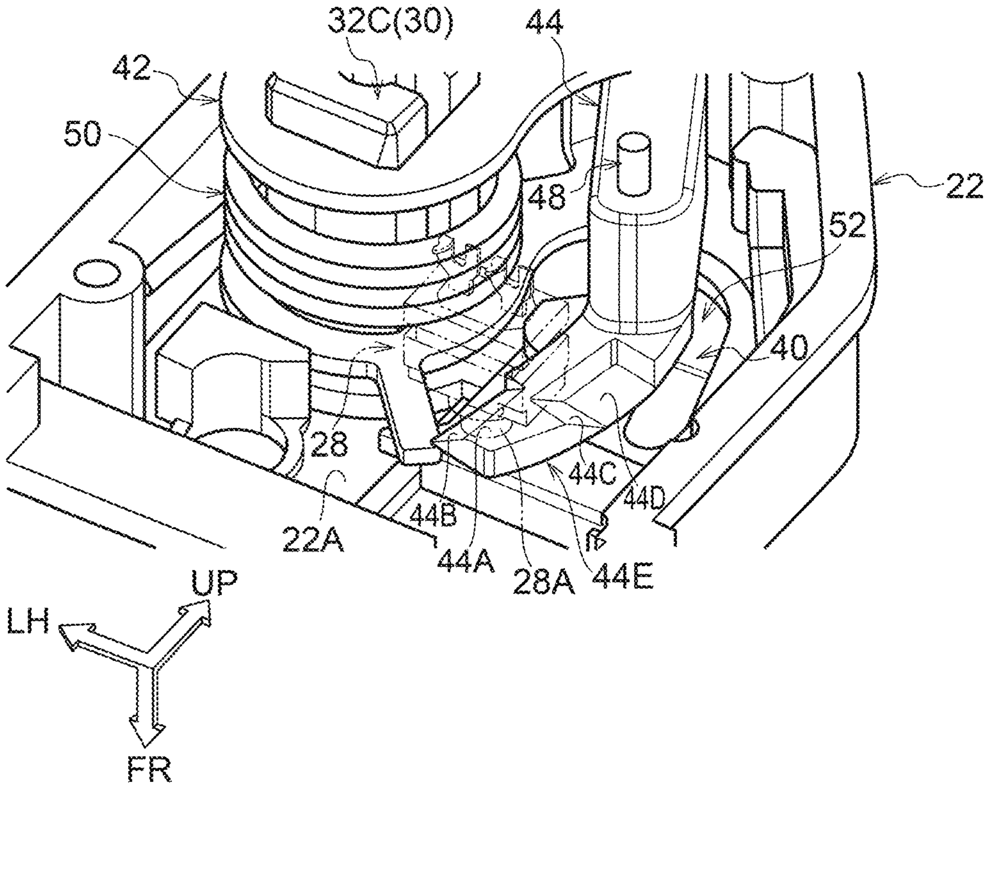
FIG. 7B is a perspective view showing a portion of the fuel lid opener of FIG. 3 in the state in which the microswitch is pressed, seen in the same direction as FIG. 6B.

A single microswitch 28 that serves as a switch portion is fixed to the cover 24 shown in FIG. 3, art a vertical direction middle portion of an inner face of the cover 24. That is, the microswitch 28 is disposed inside the case 22 in a fixed state. As shown in FIG. 7A and FIG. 7B, an actuated portion 28A of the microswitch 28 protrudes to the side thereof at which a floor wall 22A of the case 22 is disposed. The actuated portion 28A is movable in the protrusion direction and in the opposite direction. The actuated portion 28A of the micro-switch 28 may also referred to as an actuator portion. The microswitch 28 is, for example, a normally closed switch. The microswitch 28 is structured so as to output an ON signal in a state in which the actuated portion 28A is not pressed and so as to output an OFF signal in a state in which the actuated portion 28A is pressed. As shown in FIG. 3, the microswitch 28 is connected to wiring 29 that is fixed to the cover 24.

A front face of the floor wall 22A of the case 22 shown in FIG. 2 is superposed with the rear face (not shown in the drawings) of the rear wall 12A3 of the lid box 12 shown in FIG. 1. A rectangular penetrating hole (not shown in the drawings) is formed in the rear wall 12A3 at a location coinciding with a portion of the floor wall 22A (again see FIG. 2). A sealing member 26 is sandwiched between rim portions of the penetrating hole and the floor wall 22A of the case 22 shown in FIG. 2. The sealing member 26 is formed, for example, in a rectangular frame shape of rubber.

Figure 4:
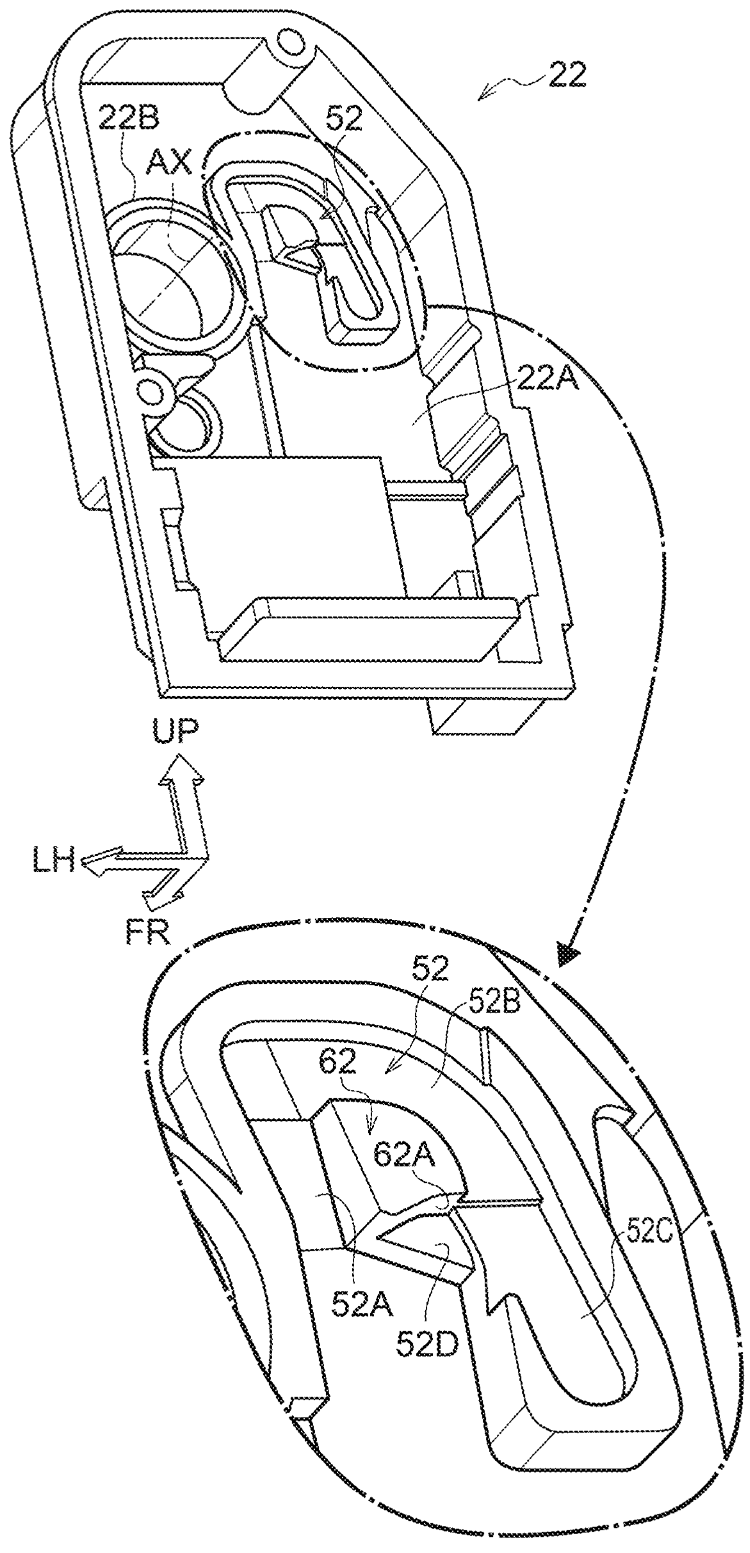
FIG. 4 is a perspective view showing a case of the fuel lid opener.

FIG. 4 shows a perspective view of the case 22. As shown in FIG. 4, a bearing portion 22B formed in a circular tube shape is formed at an upper portion of the floor wall 22A of the case 22. The bearing portion 22B is disposed with an axial direction thereof substantially in the vehicle front-and-rear direction. In the closed state of the fuel lid 14 (see FIG. 1), an axis line AX of the bearing portion 22B runs along a plate surface direction (that is, a direction along a plate face) of the fuel lid 14 (see FIG. 1). An inner side of the bearing portion 22B serves as a bearing hole (to which no reference symbol is assigned) that penetrates through the floor wall 22A of the case 22. The bearing portion 22B corresponds with a shaft portion 32 of an upper portion of the lifter 30 shown in FIG. 2.

The lifter 30 is formed of, for example, synthetic resin. The lifter 30 is provided with the shaft portion 32, which is formed in a circular column shape, and an arm portion 36, which extends in a radial direction of the shaft portion 32 from one axial direction end portion of the shaft portion 32. A portion at the one axial direction end side of the shaft portion 32 is formed as a large diameter portion (to which no reference symbol is assigned), and a portion at another axial direction end side of the shaft portion 32 is formed as a small diameter portion (to which no reference symbol is assigned) with a smaller diameter than the portion at the one axial direction end side of the shaft portion 32. This small diameter portion is inserted into the inner side of the bearing portion 22B of the case 22 (see FIG. 4), from the opposite side (the vehicle front side) of the case 22 from the side thereof at which the cover 24 is disposed. The small diameter portion is supported to be coaxial and relatively rotatable with respect to the bearing portion 22B. Thus, the lifter 30 is supported to be rotatable around the axis line AX of the bearing portion 22B (see FIG. 4) with respect to the case 22. A step surface (not shown in the drawings) between the large diameter portion and small diameter portion of the shaft portion 32 abuts, from the vehicle front side, against an abutting surface 22C that is formed at a front face side of the case 22, limiting displacement of the lifter 30 to the vehicle rear side relative to the case 22.

A link attachment portion 32C, which is shown in FIG. 3, is formed at the other axial direction end portion of the shaft portion 32. Viewed in a direction along the axis line AX of the shaft portion 32, the link attachment portion 32C is a structure that is provided with an upper and lower pair of block portions 32C1 and 32C2, proximal end sides of which are linked. An insertion receiving portion 32H in a substantially circular shape is formed at the link attachment portion 32C, at a central portion thereof as seen in the direction along the axis line AX of the shaft portion 32. The insertion receiving portion 32H extends along the axis line AX of the shaft portion 32. A protrusion 24T in a circular rod shape is formed at the cover 24, is inserted into the insertion receiving portion 32H and is fitted to the insertion receiving portion 32H to be relatively rotatable. Thus, a structure is formed in which the shaft portion 32 of the lifter 30 is also supported at the cover 24.

The arm portion 36 of the lifter 30 that is shown in FIG. 1 extends inside the lid box 12 in a rotation radius direction of the lifter 30 (to the vehicle lower side in this exemplary embodiment). The arm portion 36 is disposed so as to oppose the rear face 14A of the fuel lid 14 in the closed state from the vehicle width direction inner side thereof. As shown in FIG. 2, a distal end portion (lower end portion) of the arm portion 36 displaces to the vehicle width direction inner side when the lifter 30 rotates to one side (the direction of arrow A) around the axis line AX, and displaces to the vehicle direction outer side when the lifter 30 rotates to another side (the direction of arrow B) around the axis line AX.

A pushed portion 36A is provided at the distal end portion of the arm portion 36 of the lifter 30. The pushed portion 36A protrudes to the vehicle direction outer side (the vehicle right side in this exemplary embodiment). A distal end face (a vehicle width direction outer side face) of the pushed portion 36A is formed as a circular arc surface that is inflected in a circular arc shape as seen in the vehicle front-and-rear direction. An engaging portion 36B in a circular rod shape is formed protruding from the front face side of the pushed portion 36A. The engaging portion 36B is disposed with an axial direction thereof in a direction along the rotation axis line AX of the lifter 30. The engaging portion 36B protrudes from the pushed portion 36A (the distal end portion of the arm portion 36) to one side (the vehicle front side in this exemplary embodiment) in the direction along the axis line AX. The engaging portion 36B and pushed portion 36A are disposed side by side in the direction along the axis line AX. When the outer face side of the fuel lid 14 (see FIG. 1) is push-operated, the engaging portion 36B of the lifter 30 receives a pushing force from the pushing portion 18A of the fuel lid 14 (again see FIG. 1). Thus, the arm portion 36 of the lifter 30 receives a force causing the arm portion 36 to rotate to the one side (the direction of arrow A) around the axis line AX (see FIG. 8B and FIG. 11A). The lifter 30 with the structure described above is provided in correspondence with the push lifter mechanism 38 provided inside the case 22, which is shown in FIG. 3.

Figure 6A:
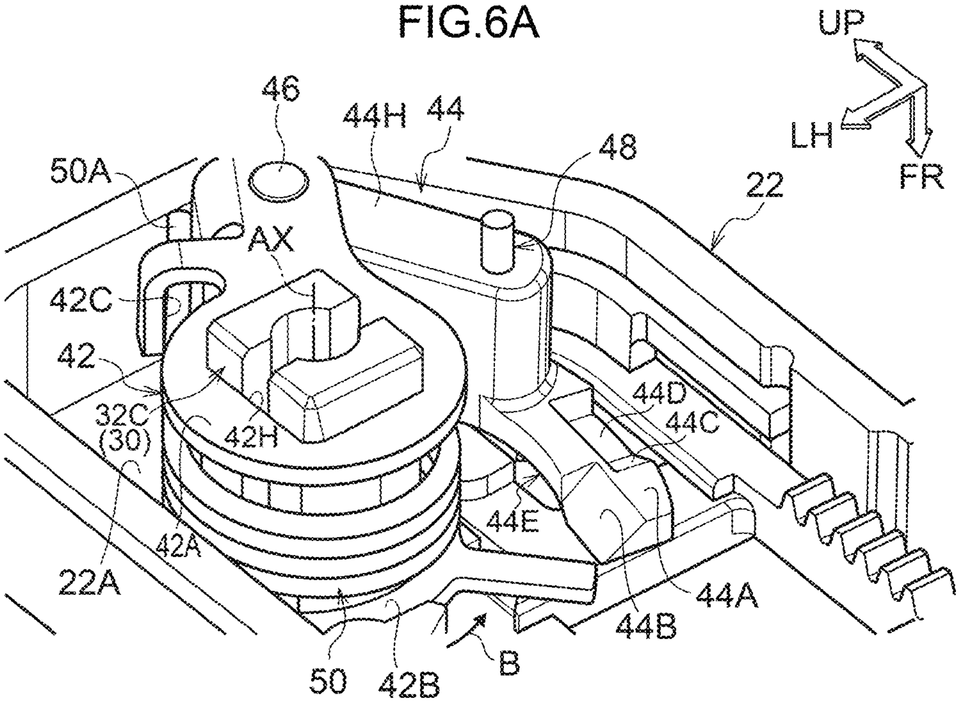
FIG. 6A is a perspective view showing a portion of the fuel lid opener of FIG. 3 in a state in which a cover is removed.
Figure 6B:
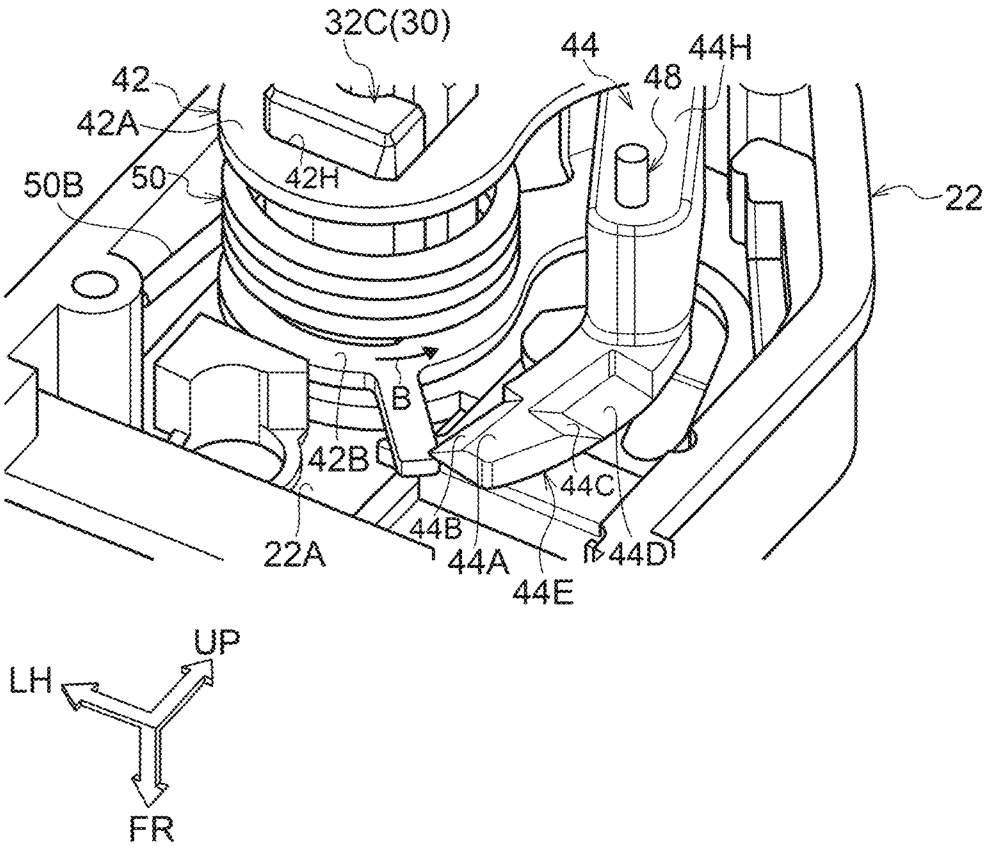
FIG. 6B is a perspective view showing a portion of the fuel lid opener of FIG. 3 in the state in which the cover is removed, seen in a different direction from FIG. 6A.

As shown in FIG. 3, the push lifter mechanism 38 is provided with a first link 42, a first link pin 46, a second link 44 that is provided with a second link pin 48, a torsion spring that serves as an urging member, and a cam slot 52 (see FIG. 4) that is formed in the floor wall 22A of the case 22. As shown in FIG. 6A and FIG. 6B, the first link 42 is formed by, for example, press-forming of metal plate. The first link 42 is formed in an inflected plate shape in a substantial "U" shape that includes a pair of flat plate portions 42A and 42B that oppose one another in the direction of the rotation axis line AX of the lifter 30. Seen in the direction along the rotation axis line AX of the lifter 30, penetrating holes 42H are formed in one end sides of the pair of flat plate portions 42A and 42B (the penetrating hole in the flat plate portion 42B is not shown in the drawings). The link attachment portion 32C of the lifter 30 is fitted in the penetrating holes 42H. Thus, the first link 42 is attached to the lifter 30, and displacement of the lifter 30 to the vehicle front side relative to the case 22 is limited by the first link 42.

The torsion spring 50 is disposed between the pair of flat plate portions 42A and 42B at the outer periphery side of the link attachment portion 32C of the lifter 30. The torsion spring 50 is disposed coaxially with the rotation axis line AX of the lifter 30. One end portion 50A of the torsion spring 50 shown in FIG. 6A is engaged with a spring anchoring portion 42C that is formed continuously from the flat plate portion 42A of the first link 42. Another end portion 50B of the torsion spring 50, which is shown in FIG. 6B, is attached to the case 22. The torsion spring 50 urges the lifter 30 shown in FIG. 6A to the other side (the direction of arrow B) around the axis line AX. When the fuel lid 14 (see FIG. 1) is in a pressed state that is pushed in further than the closed state, the torsion spring 50 urges the lifter 30 to return to the position thereof at the closed state. A helical spring or a spiral spring may be employed instead of the torsion spring 50.

The second link 44 is formed of, for example, synthetic resin. The second link 44 is provided with a second link main body 44H, one end portion of which is coupled to the first link 42, and a projection portion 44E that projects from another end portion of the second link main body 44H. The second link main body 44H is formed in a long, narrow shape as seen in the direction along the rotation axis line AX of the lifter 30. The second link main body 44H has a thickness in the direction along the rotation axis line AX of the lifter 30 that is slightly smaller than a separation between the pair of flat plate portions 42A and 42B. The one end portion of the second link main body 44H and another end portion of the first link 42 are coupled to be relatively rotatable by the first link pin 46. The first link pin 46 is disposed with an axial direction thereof in a direction parallel to the rotation axis line AX of the lifter 30. Thus, the second link 44 is coupled to be rotatable relative to the first link 42 around an axis parallel to the rotation axis line AX.

The second link pin 48 (an element that may be understood as a cam pin) is fixed to another end portion of the second link main body 44H. The second link pin 48 is disposed with an axial direction thereof in a direction parallel to the rotation axis line AX of the lifter 30. A guided portion 48A (see FIG. 13B, FIG. 14 and FIG. 15) protrudes from the second link pin 48 to the side thereof at which the floor wall 22A of the case 22 is disposed. The guided portion 48A is inserted into the cam slot 52 formed in the floor wall 22A of the case 22 (see FIG. 4) and is movable along the cam slot 52.

The projection portion 44E of the second link 44 projects in an arm shape from a portion of the other end portion of the second link main body 44H that is at the side thereof at which the floor wall 22A is disposed (the vehicle front side). The projection portion 44E of the second link 44 is formed substantially in a circular arc shape as seen in the direction along the rotation axis line AX of the lifter 30. The projection portion 44E is provided with an actuation pressing portion 44A in a flat surface shape that presses the actuated portion 28A of the microswitch 28 (again see FIG. 7A and FIG. 7B) when the fuel lid 14 is in the closed state (see FIG. 1). The actuation pressing portion 44A is formed at a portion of the projection portion 44E of the second link 44 that is at a side in the direction of a distal end portion of the projection portion 44E in the projection direction. The actuation pressing portion 44A is disposed with surface directions in a plane including the vehicle vertical direction and the vehicle width direction.

The projection portion 44E of the second link 44 includes a first angled surface 44B and a second angled surface 44C. The first angled surface 44B is continuous with an end portion at the vehicle width direction inner side of the actuation pressing portion 44A and is formed so as to be angled up toward the side thereof at which the actuation pressing portion 44A is formed. The second angled surface 44C is provided separately from the first angled surface 44B, is continuous with an end portion at the vehicle upper side of the actuation pressing portion 44A and is formed so as to be angled up toward the side thereof at which the actuation pressing portion 44A is formed. A recess floor portion 44D is formed continuously from an end portion at the opposite side of the second angled surface 44C from the side thereof at which the actuation pressing portion 44A is formed. The recess floor portion 44D is recessed by a step relative to the actuation pressing portion 44A. The recess floor portion 44D is configured so as not to press the actuated portion 28A even when the microswitch 28, which is shown in FIG. 7A and FIG. 7B, is disposed at a position opposing the recess floor portion 44D.

As shown in FIG. 4, the cam slot 52 is formed in a shape in which a heart shape (an inverted heart shape in this exemplary embodiment) as seen in the direction along the rotation axis line AX of the lifter 30 is partially inserted, with a depth direction of the cam slot 52 being the direction of the rotation axis line AX of the lifter 30, and the cam slot 52 being open to the vehicle rear side. As shown in a partial magnified view in FIG. 4, the cam slot 52 is provided with a first slot portion 52A, a second slot portion 52B, and a third slot portion 52C. The first slot portion 52A extends substantially in the vehicle vertical direction. The second slot portion 52B forms a curve portion of a substantial "R" shape, extending to the vehicle width direction outer side from an upper end portion of the first slot portion 52A and then extending to the vehicle lower side. The third slot portion 52C extends to the vehicle lower side from a lower end portion of the second slot portion 52B. An island portion 62 that protrudes to the vehicle rear side is formed between the first slot portion 52A and the region of the second slot portion 52B that is at the vehicle width direction outer side. A lower face of the island portion 62 includes a catch surface 62A in a non-recessed shape. A region at the vehicle width direction inner side of an upper portion of the third slot portion 52C is inserted so as to communicate with a space at the lower side of the island portion 62. A platform portion 52D is formed at the lower side of the island portion 62. The platform portion 52D is a protrusion that is a little to the vehicle rear side relative to the floor wall 22A of the case 22.

Figure 14:
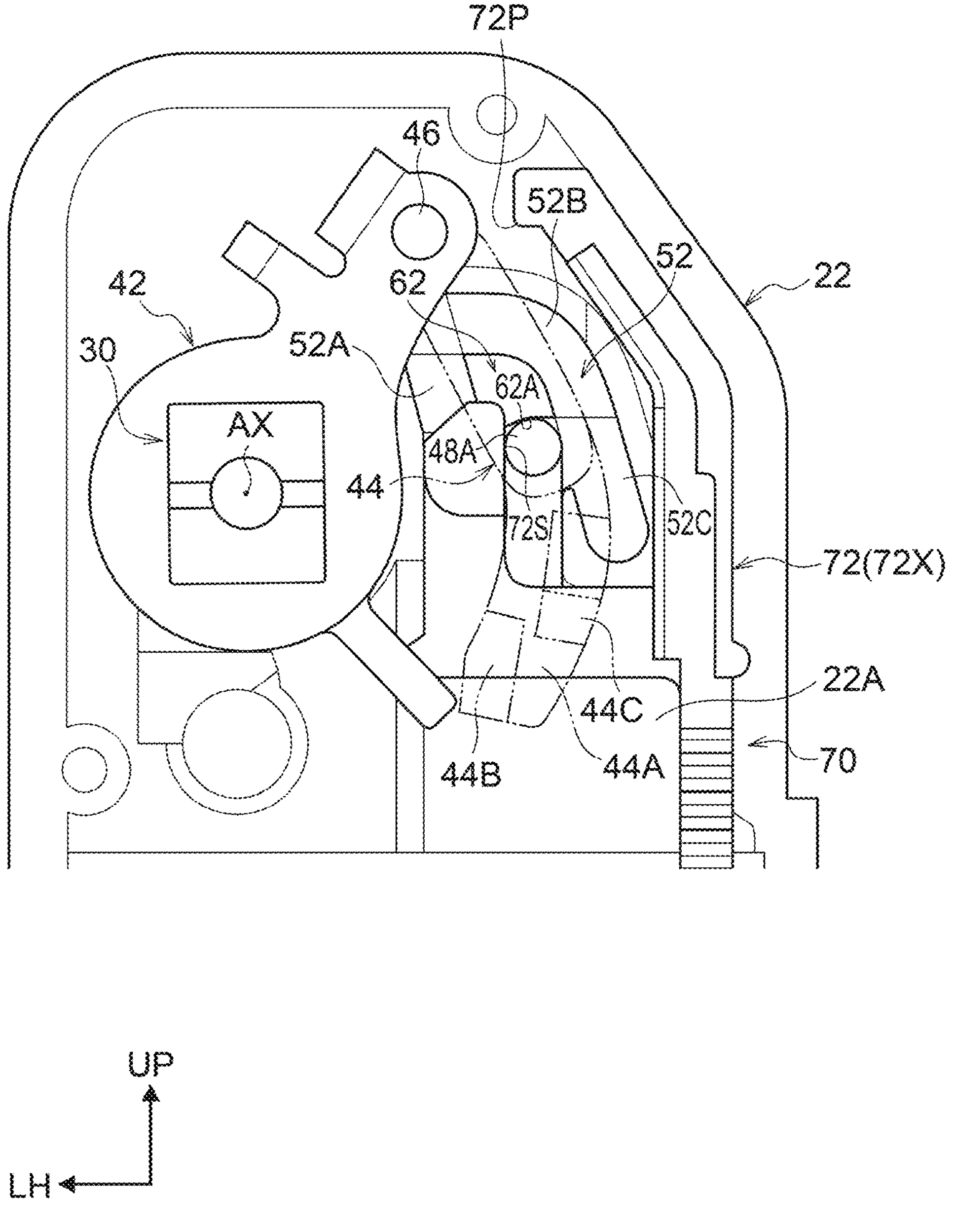
FIG. 14 is a magnified view showing a supported state of a guided portion when the fuel lid is in the closed state.

As shown in FIG. 14, the aforementioned guided portion 48A is inserted into the cam slot 52. A distal end portion of the guided portion 48A is pressed against a floor face of the cam slot 52. The aforementioned catch surface 62A of the island portion 62 is specified so as to touch the guided portion 48A at one side (the upper side in this exemplary embodiment) in a direction orthogonal to the axis line AX when the actuated portion 28A of the microswitch 28 (again see FIG. 7B) is being pressed by the actuation pressing portion 44A. As shown in the partial magnified diagram in FIG. 4, angled surfaces are formed in the cam slot 52 at a floor face of the first slot portion 52A and a floor face of the second slot portion 52B, and respective steps are formed between the floor face of the first slot portion 52A and the floor face of the second slot portion 52B, between the floor face of the second slot portion 52B and a floor face of the third slot portion 52C, and between the floor face of the third slot portion 52C and a top face of the platform portion 52D. Thus, displacements of the guided portion 48A along the cam slot 52 (see FIG. 14) are restricted to directions along a path of the first slot portion 52A, the second slot portion 52B, the third slot portion 52C and the platform portion 52D in that order. A driving unit 70, which is shown in FIG. 3, is disposed in regions at the lower side and the vehicle width direction outer side of the cam slat 52.

The driving unit 70 is provided with a moving body 72 and a motor 74 that serves as a drive source. The moving body 72 is disposed at the vehicle width direction outer side of the interior of the case 22. The motor 74 is disposed at the vehicle width direction inner side with respect to a lower portion of the moving body 72. The motor 74 is fixed to a lower portion of the case 22. A rotary gear 76A is attached to an output shaft of the motor 74. A rotary gear group 76 including the rotary gear 76A is provided for transmitting driving force of the motor 74. A final rotary gear of the rotary gear group 76 is a pinion gear 76P.

Figure 5A:
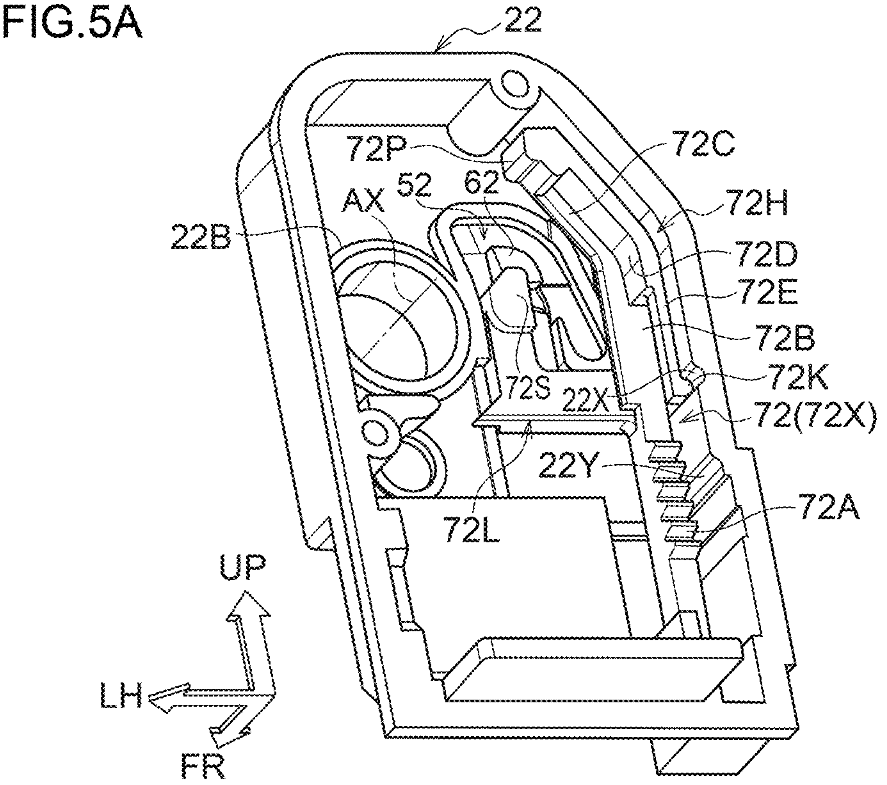
FIG. 5A is a perspective view showing a structure in which a moving body is disposed in the case of FIG. 4, in a state at a time of non-operation of a motor.

FIG. 5A shows a perspective view of structures of the moving body 72 disposed in the case 22. The moving body 72 shown in FIG. 5A is formed of, for example, synthetic resin, and is supported by the case 22 to be movable in the vertical direction. To describe this more specifically, when the actuated portion 28A of the microswitch 28 is pressed by the actuation pressing portion 44A, the moving body 72 is movable between a restricting position 72X illustrated in FIG. 5A and a restriction release position 72Y illustrated in FIG. 5B. The restricting position 72X is a position of the moving body 72 that restricts operation of the second link 44, and the moving body 72 at the restriction release position 72Y releases this restriction.

Rack teeth 72A are formed in a vertical array at a rear face of a lower portion of the moving body 72. The aforementioned pinion gear 76P (see FIG. 3) meshes with the rack teeth 72A. Thus, the moving body 72 is moved from the restricting position 72X illustrated in FIG. 5A to the restriction release position 72Y illustrated in FIG. 5B by operation of the motor 74 (see FIG. 3). The motor 74 shown FIG. 3 is connected to a control unit 80 (only outlines of which are schematically shown in the drawings, as two-dot chain lines). The motor 74 is controlled by the control unit 80.

Figure 5B:
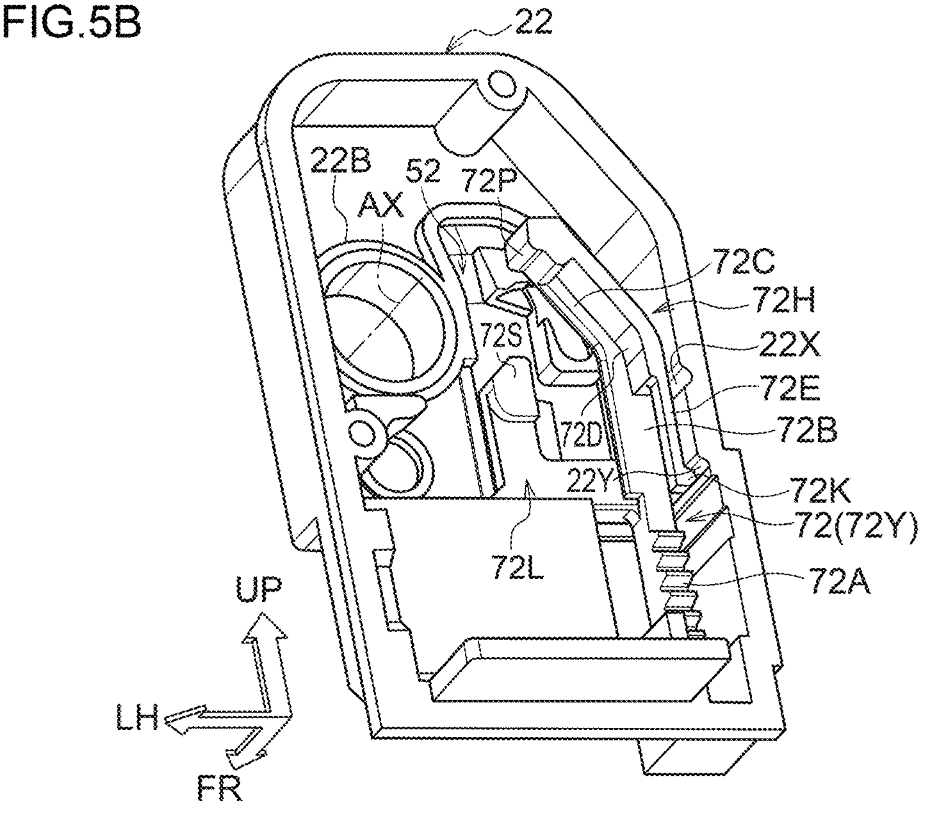
FIG. 5B is a perspective view showing the structure in which the moving body is disposed in the case of FIG. 4, in a state after movement at a time of operation of the motor.

As shown in FIG. 5A and FIG. 5B, the moving body 72 is provided with a strip projection portion 72H and an "L"-shaped branching portion 72L. The strip projection portion 72H extends in a long, narrow shape to the vehicle upper side from a lower portion of the moving body 72. The branching portion 72L branches from the lower portion side of the strip projection portion 72H, extends to the vehicle direction inner side, and then extends to the vehicle upper side. A lower portion 72B of the strip projection portion 72H extends in the vehicle vertical direction. An upper portion 72C of the strip projection portion 72H is angled a little to the vehicle width direction inner side toward the vehicle upper side. A protruding wall portion 72D that protrudes to the vehicle rear side is formed in a region at the vehicle width direction outer side of the upper portion 72C of the strip projection portion 72H and a vicinity thereof.

A strip piece 72E projects to the vehicle lower side in a cantilevered state from a portion at the vehicle rear side of a lower end portion of the protruding wall portion 72D. An engaging protrusion portion 72K is integrally formed protruding to the vehicle width direction outer side from a lower end portion of the strip piece 72E. As shown in FIG. 5A, in the state in which the moving body 72 is disposed at the restricting position 72X, the engaging protrusion portion 72K is engaged with a first anchoring recess portion 22X that is formed in the inner face of a sidewall at the vehicle width direction outer side of the case 22. As shown in FIG. 5B, in the state in which the moving body 72 is disposed at the restriction release position 72Y, the engaging protrusion portion 72K is engaged with a second anchoring recess portion 22Y that is formed in the inner face of the side wall at the vehicle width direction outer side of the case 22.

Figure 15:
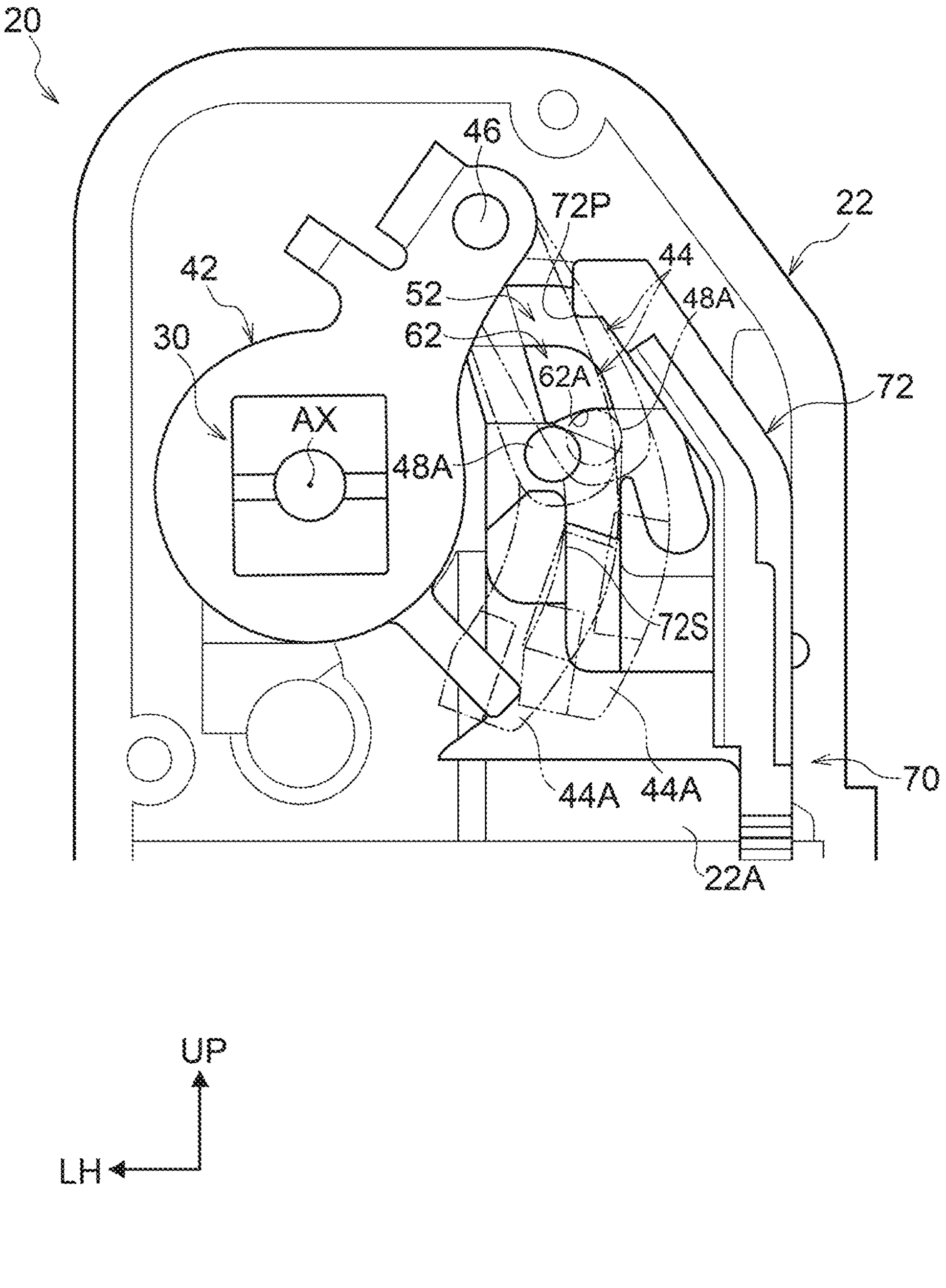
FIG. 15 is a view showing a state in which the guided portion is separated from the state in FIG. 14.
Figure 16:
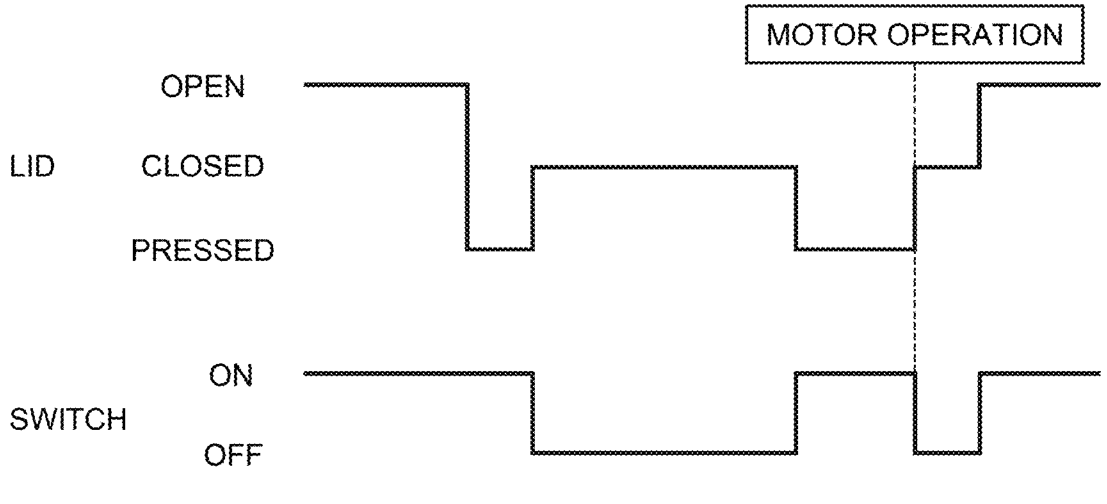
FIG. 16 is a diagram showing changes in states of the fuel lid and changes in signals outputted from a switch.

A push-out portion 72P protrudes from an upper end portion of the protruding wall portion 72D to the side thereof at which the second link 44 is disposed (see FIG. 3). When the moving body 72 moves from the restricting position 72X illustrated in FIG. 5A to the restriction release position 72Y illustrated in FIG. 5B, the push-out portion 72P pushes out the second link 44 such that the guided portion 48A separates to the vehicle width direction inner side from the catch surface 62A of the cam slot 52, as shown in FIG. 15.

As shown in FIG. 5A, an upper portion of the branching portion 72L of the moving body 72 is provided with a stopper portion 72S that protrudes to the vehicle rear side. In the state in which the moving body 72 is disposed at the restricting position 72X, the stopper portion 72S is disposed adjacent to a region at the vehicle width direction inner side (the left side in the drawings) of the lower face of the island portion 62. That is, as shown in FIG. 14, the stopper portion 72S is formed such that, when the moving body 72 is disposed at the restricting position 72X and restricts operation of the second link 44, seen in the direction along the axis line AX, the stopper portion 72S is disposed at one side (the vehicle width direction inner side in this exemplary embodiment) of the guided portion 48A in a direction orthogonal to the side of the guided portion 48A at which the catch surface 62A is disposed, and the stopper portion 72S restricts movement of the guided portion 48A. When the moving body 72 is disposed at the restriction release position 72Y (see FIG. 5B), the stopper portion 72S is disposed at a position at which contact thereof with the guided portion 48A is disabled.

The push lifter mechanism 38 shown in FIG. 3 is a structure that, when the driving unit 70 operates, rotates the lifter 30 to the other side (the direction of arrow B) around the axis line AX and pushes the fuel lid 14 shown in FIG. 1 to open. This is described more specifically below.

The push lifter mechanism 38 shown in FIG. 3 is provided with a contact/non-contact switching mechanism 40 that is operated by rotation of the lifter 30 to move away from the actuated portion 28A of the microswitch 28 (see FIG. 7A and the like). The contact/non-contact switching mechanism 40 is a mechanism section that utilizes the first link 42, the first link pin 46, the second link 44 provided with the second link pin 48, the torsion spring 50, the cam slot 52 (see FIG. 4) and the driving unit 70 to perform the function of moving away from the actuated portion 28A of the microswitch 28 (see FIG. 7A and the like).

Figure 8A:
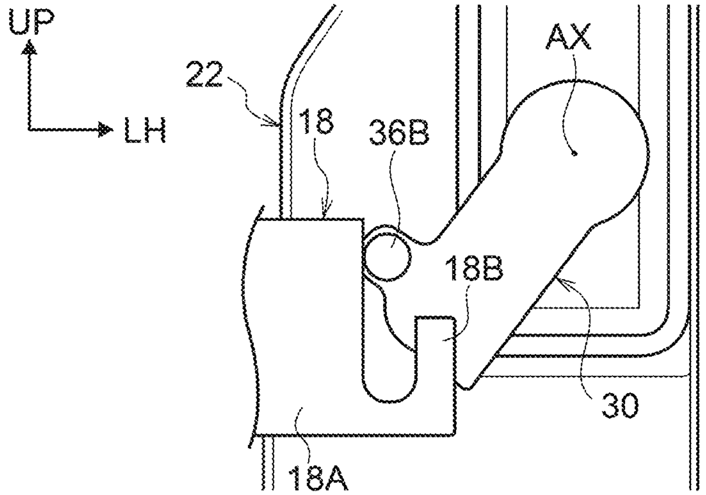
FIG. 8A is a side view showing a state of the arm portion when the fuel lid is in the open state.
Figure 8B:
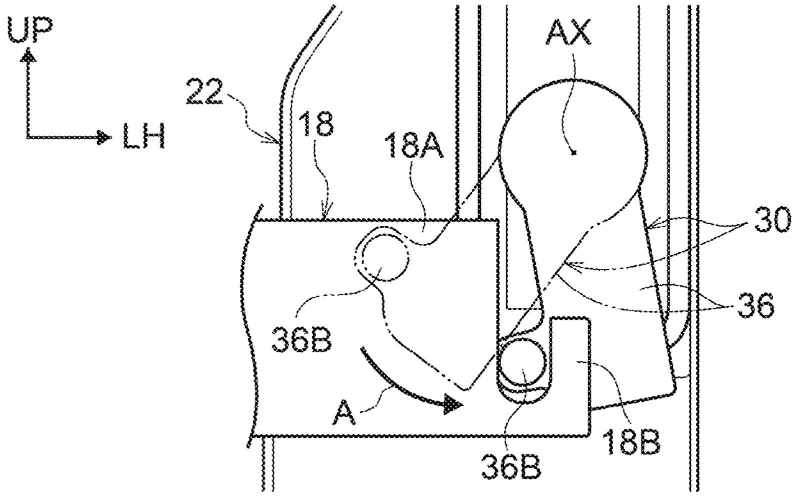
FIG. 8B is a side view showing a state of the arm portion when the fuel lid is pushed in from the open state to be in a pressed state.
Figure 8C:
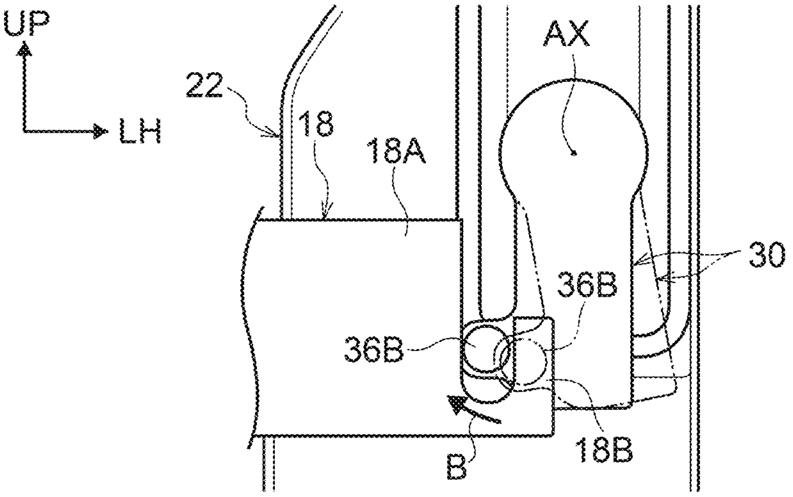
FIG. 8C is a side view showing a state of the arm portion when the fuel lid is in a closed state.

The contact/non-contact switching mechanism 40 is structured so as to switch the signal outputted from the microswitch 28 (see FIG. 3) from the ON signal, which serves as a first signal, to the OFF signal, which serves a second signal (see FIG. 16), by performing a prescribed first operation when the fuel lid 14 (see FIG. 1) goes from the open state to the closed state and the pressed state (the state that is pushed in further than the closed state) and then returns to the closed state (when the fuel lid 14 passes through the states shown in FIG. 8A, FIG. 8B and FIG. 8C in that order). In the present exemplary embodiment, the actuated portion 28A of the microswitch 28 shown in FIG. 7A and FIG. 7B is configured such that, when the contact/non-contact switching mechanism 40 performs the first operation, the actuated portion 28A of the microswitch 28 relatively moves with respect to the contact/non-contact switching mechanism 40 such that positional relationships of the actuated portion 28A of the microswitch 28 with respect to the contact/non-contact switching mechanism 40 pass through FIG. 9A, FIG. 9B and FIG. 9C in that order (viewed from a different direction, FIG. 10A, FIG. 10B and FIG. 10C in that order). The aforementioned first angled surface 44B of the second link 44 is specified so as to press the actuated portion 28A of the microswitch 28 steadily in a final stage of the first operation of the contact/non-contact switching mechanism 40.

Figure 11A:
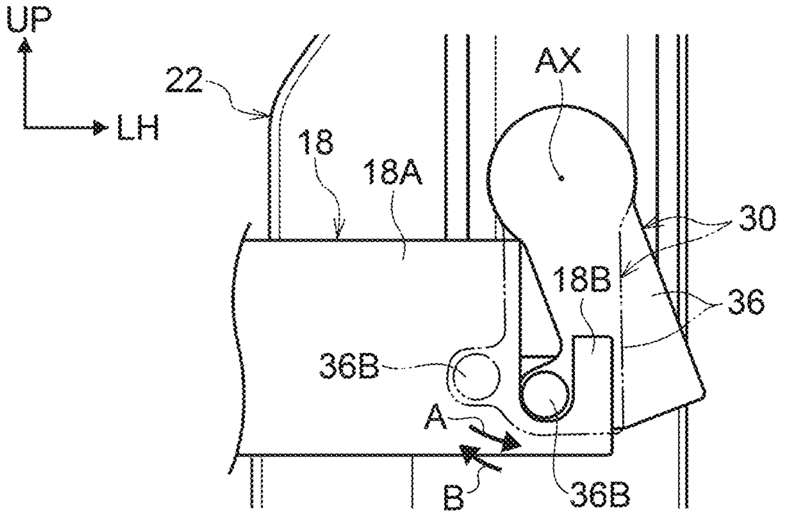
FIG. 11A is a side view showing a state of the arm portion when the fuel lid is pushed in from the closed state to be in the pressed state.

The contact/non-contact switching mechanism 40 is also structured so as to switch the signal outputted from the microswitch 28 (see FIG. 3) from the OFF signal to the ON signal and the OFF signal in that order (see FIG. 16) by performing a prescribed second operation, which is different from the first operation, when the fuel lid 14 (see FIG. 1) goes from the closed state to the pressed state and then returns to the closed state (i.e., when the lifter 30 in FIG. 11A goes from the position shown by two-dot chain lines to the position shown by solid lines and then returns to the position shown by two-dot chain lines). In the present exemplary embodiment, the actuated portion 28A of the microswitch 28 shown in FIG. 7A and FIG. 7B is configured such that, when the contact/non-contact switching mechanism 40 performs the second operation, the actuated portion 28A of the microswitch 28 relatively moves with respect to the contact/non-contact switching mechanism 40 such that positional relationships of the actuated portion 28A of the microswitch 28 with respect to the contact/non-contact switching mechanism 40 pass through FIG. 9C, FIG. 12A and FIG. 9C in that order (viewed from the different direction, FIG. 10C, FIG. 13A and FIG. 10C in that order). The aforementioned second angled surface 44C of the second link 44 is specified so as to press the actuated portion 28A of the microswitch 28 steadily in a final stage of the second operation of the contact/non-contact switching mechanism 40.

The control unit 80 shown in FIG. 3 operates the motor 74 in response to a condition at least of the signal outputted from the microswitch 28 switching from the OFF signal to the ON signal and the OFF signal in that order within a prescribed time. Thus, the control unit 80 causes the driving unit 70 shown in FIG. 3 to operate (to move the moving body 72 from the restricting position 72X shown in FIG. 9C and FIG. 10C to the restriction release position 72Y shown in FIG. 12B and FIG. 13B) so as to rotate the lifter 30 shown in FIG. 2 to the other side (in the direction of arrow B) around the axis line AX. To describe this more specifically for the present exemplary embodiment, when the signal outputted from the microswitch 28 switches from the OFF signal to the ON signal and then to the OFF signal in that order within the prescribed time and the control unit 80 shown in FIG. 3 determines that the initial OFF signal was outputted continuously for at least a reference time specified in advance (for example, 1 second), the control unit 80 causes the driving unit 70 shown in FIG. 3 to operate such that the lifter 30 shown. FIG. 2 is rotated to the other side (the direction of arrow B) around the axis line AX.

Figure 11B:
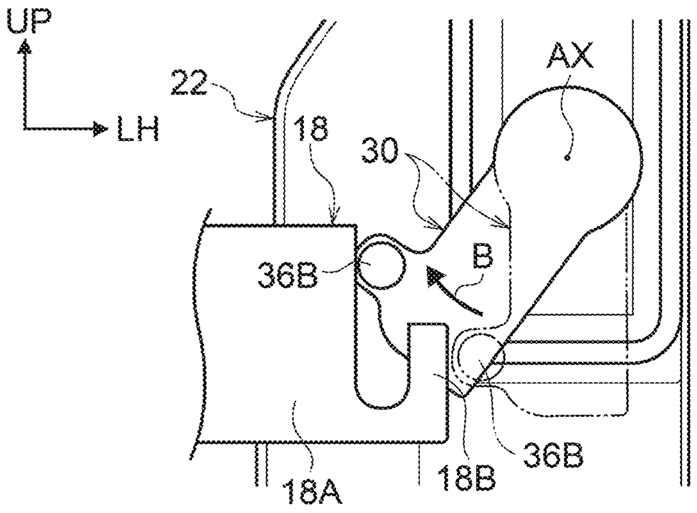
FIG. 11B is a side view showing a state of the arras portion when the fuel lid goes from the closed state to the open state.
Figure 12A:
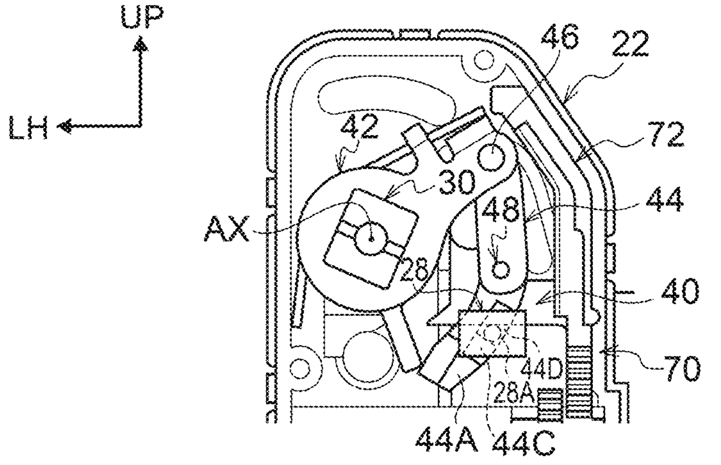
FIG. 12A is a view showing a state in which a portion of the interior of the fuel lid opener is seen from the opposite side from FIG. 11A when the fuel lid is pushed in from the open state so as to be in the pressed state.
Figure 12B:
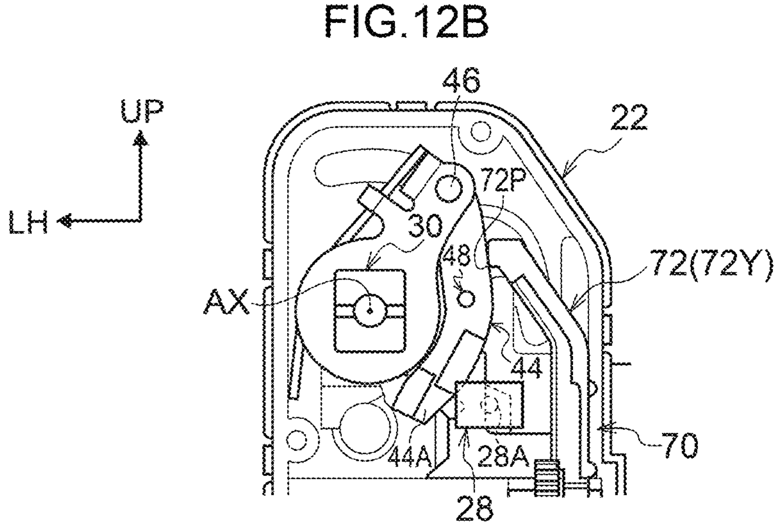
FIG. 12B is a view showing a state in which a driving unit operates from the state in FIG. 12A and a portion of the moving body abuts against a second link.
Figure 12C:
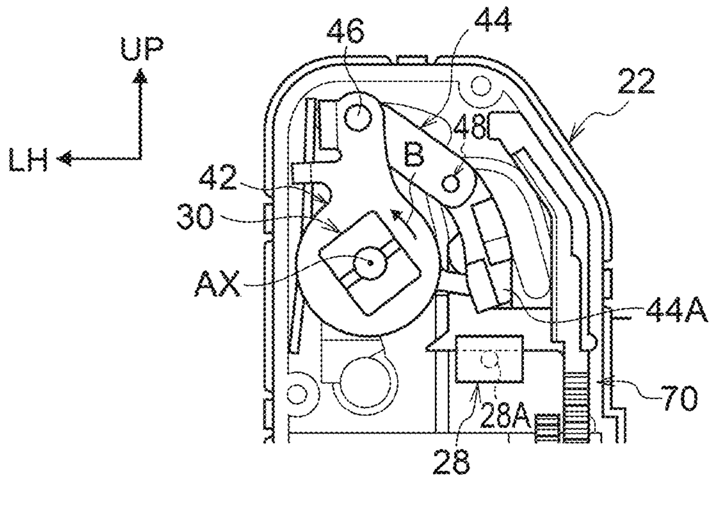
FIG. 12C is a view showing a state in which a lifter is rotated by urging force of a torsion spring subsequent to the state in FIG. 12B.
Figure 13A:
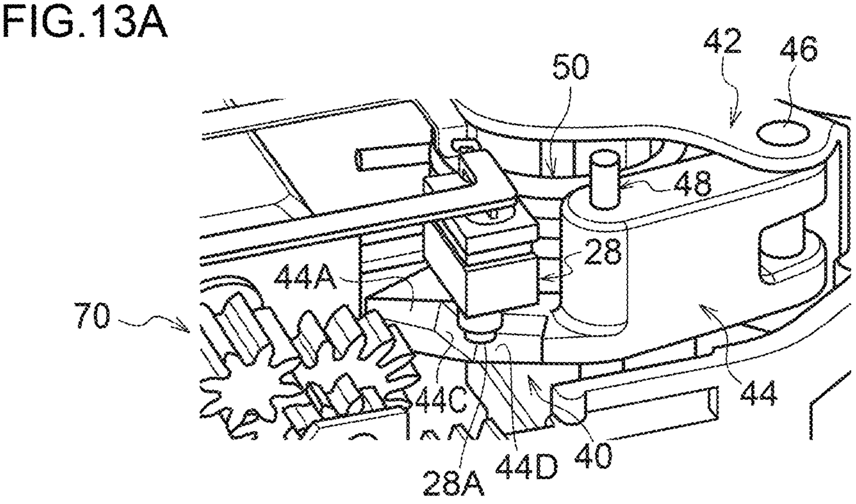
FIG. 13A is a perspective view of a portion of the interior of the fuel lid opener in the same state as in FIG. 12A.
Figure 13B:
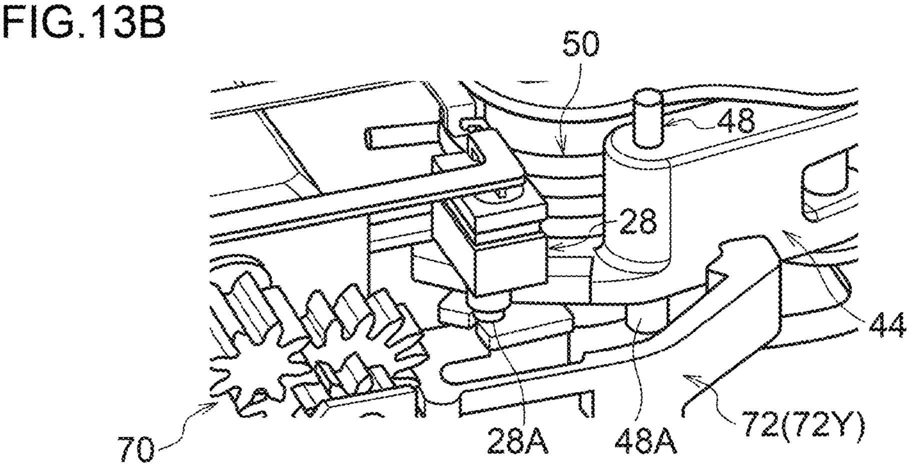
FIG. 13B is a perspective view of a portion of the interior of the fuel lid opener in the same state as in FIG. 12B.
Figure 13C:
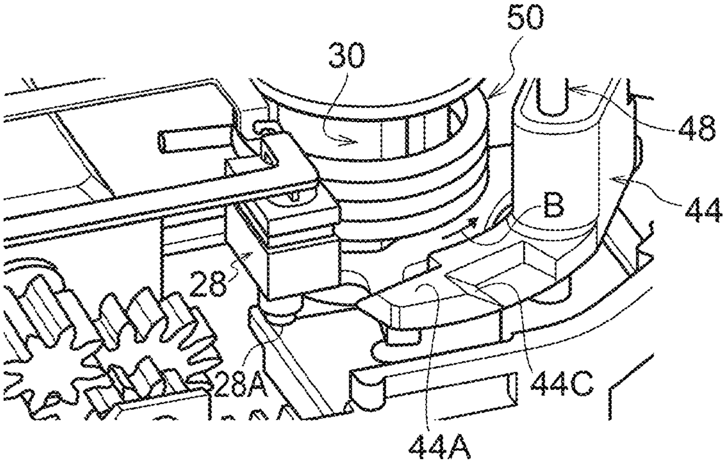
FIG. 13C is a perspective view of a portion of the interior of the fuel lid opener in the same state as in FIG. 12C.

To describe the operation of the above-mentioned driving unit 70 even more specifically, when the push lifter mechanism 38 pushes the fuel lid 14 (see FIG. 1) to open, the guided portion 48A shown in FIG. 14, which is at a position at which movement by the urging force of the torsion spring 50 is disabled, is disengaged from that position (the position at which movement by the urging force of the torsion spring 50 is disabled) by driving force of the driving unit 70 as shown in FIG. 15 (that is, by the push-out portion 72P of the moving body 72 pushing the second link 44). Hence, via the first link 42, the lifter 30 is rotated to the other side (the direction of arrow B) around the axis line AX by the urging force of the torsion spring 50 (see FIG. 3) as shown in FIG. 12C. FIG. 11B is a view of a state in which the state in FIG. 12C is seen from the opposite side of the case 22, and FIG. 13C is a perspective view in which the state in FIG. 12C is seen in a different direction. In the state shown in FIG. 12C, the ON signal is outputted from the microswitch 28.

Now, operation and effects of the above exemplary embodiment are described.

In the fuel lid opener 20 with the structure described above, the fuel lid 14 is supported at the lid box 12 shown in FIG. 1 to be rotatable for opening and closing, and the case 22 shown in FIG. 2 is attached to the outer periphery face of the side wall 12A of the lid box 12 (the rear face of the rear wall 12A3). The lifter 30 is supported at the case 22 to be rotatable around the axis line AX that runs along a plate surface direction of the fuel lid 14 in the closed state (see FIG. 1). The arm portion 36 of the lifter 30 extends in the rotation radius direction within the lid box 12 (see FIG. 1) and receives a force that rotates the arm portion 36 to the one side (the direction of arrow A) around the axis line AX when the outer face side of the fuel lid 14 is push-operated. As shown in FIG. 3, the push lifter mechanism 38 is provided in the case 22, the torsion spring 50 of the push lifter mechanism 38 urges the lifter 30 to the other side (the direction of arrow B) around the axis line AX, and the torsion spring 50 urges such that the fuel lid 14 returns to the position thereof in the closed state when the fuel lid 14 is in the pressed state that is pushed in further than the closed state. When the driving unit 70 operates, the push lifter mechanism 38 causes the lifter 30 to rotate to the other side (the direction of arrow B) around the axis line AX and pushes the fuel lid 14 to open.

The contact/non-contact switching mechanism 40 is provided art the push lifter mechanism 38. The contact/non-contact switching mechanism 40 is operated by rotation of the lifter 30 to move in and out of contact with the actuated portion 28A of the microswitch 28 (see FIG. 7A and the like). The contact/non-contact switching mechanism 40 is structured (see FIG. 16) so as to, when the fuel lid 14 goes from the open state to the closed state and the pressed state and then returns to the closed state, switch the signal outputted from the microswitch 28 from the ON signal to the OFF signal by performing the prescribed first operation. The contact/non-contact switching mechanism 40 is also structured (see FIG. 16) so as to, when the fuel lid 14 goes from the closed state to the pressed state and then returns to the closed state, switch the signal outputted from the microswitch 28 from the OFF signal to the ON signal and the OFF signal in that order by performing the prescribed second operation that is different from the first operation. Consequent to the condition at least of the signal outputted from the microswitch 28 switching from the OFF signal to the ON signal and to the OFF signal in that order within the prescribed time, the control unit 80 causes the driving unit 70 to operate so as to rotate the lifter 30 to the other side (in the direction of arrow B) around the axis line AX. Thus, even if the fuel lid (see FIG. 1) is push-operated from the open state slowly, misoperation may be prevented.

More specifically, when the signal outputted from the microswitch 28 switches from the OFF signal to the ON signal and the OFF signal in that order within the prescribed time and the control unit 80 determines that the initial OFF signal was outputted continuously for at least the reference time specified in advance, the control unit 80 causes the driving unit 70 to operate such that the lifter 30 is rotated to the other side (the direction of arrow B) around the axis line AX, as shown in FIG. 3. In the fuel lid opener 20 according to the present exemplary embodiment, operation of the motor 74 is implemented at a moment at which the fuel lid 14 has gone from the closed state to the pressed state and returned to the closed state and the signal outputted from the microswitch 28 has become the OFF signal. After this operation of the motor 74, the signal outputted from the microswitch 28 promptly (in less than 1 second) switches from the OFF signal to the ON signal (see FIG. 16). Therefore, even when control is performed by reference to a continuous output time of the OFF signal, misoperation may be prevented.

In the present exemplary embodiment, the switch portion is structured by the single microswitch 28 that is disposed in a fixed state within the case 22, and is structured such that a relative movement path of the actuated portion 28A of the microswitch 28 with respect to the contact/non-contact switching mechanism 40 (see FIG. 7A and the like) is different when the contact/non-contact switching mechanism 40 performs the first operation and when the contact/non-contact switching mechanism 40 performs the second operation. Therefore, signals may be outputted appropriately without plural switches being provided.

In the present exemplary embodiment, the push lifter mechanism 38 includes the cam slot 52 (see FIG. 4), the first link 42 and the second link 44. The cam slot 52 shown in FIG. 4 is provided at the case 22 with the depth direction thereof in a direction along the axis line AX. The first link 42 shown FIG. 3 is attached to the lifter 30. The second link 44 is coupled to be rotatable relative to the first link 42 around an axis parallel to the axis line AX, and is provided with the actuation pressing portion 44A (see FIG. 6A) and the guided portion 48A (see FIG. 14). The actuation pressing portion 44A shown FIG. 7A is formed in a flat surface shape and presses the actuated portion 28A of the microswitch 28 when the fuel lid 14 is in the closed state. The guided portion 48A shown in FIG. 14 is inserted into the cam slot 52 and is movable along the cam slot 52. Thus, pressing of the actuated portion 28A of the microswitch 28 shown in FIG. 7A is controlled by the second link 44 being guided by and moving in the cam slot 52.

In the present exemplary embodiment, when the push lifter mechanism 38 shown in FIG. 3 pushes the fuel lid 14 to open, the guided portion 48A is disengaged by the driving force of the driving unit 70 as shown in FIG. 15 (that is, by the push-out portion 72P of the moving body 72 pushing the second link 44) from the position shown in FIG. 14 at which movement by the urging force of the torsion spring 50 is disabled. Thus, via the first link 42, the lifter 30 is rotated to the other side (in the direction of arrow B) around the axis line AX as shown in FIG. 12C by the urging force of the torsion spring 50 (see FIG. 3). Thus, the driving force of the driving unit 70 and the urging force of the torsion spring 50 may be utilized to put the fuel lid 14 into the open state.

In the present exemplary embodiment, the first angled surface 44B of the second link 44 shown in FIG. 7A is continuous with the actuation pressing portion 44A and is formed so as to be angled up toward the side thereof at which the actuation pressing portion 44A is formed. The first angled surface 44B presses the actuated portion 28A of the microswitch 28 steadily in the final stage of the first operation of the contact/non-contact switching mechanism 40. Therefore, even with a relatively simple structure, the signal that is outputted from the microswitch 28 can be switched stably in the final stage of the first operation of the contact/non-contact switching mechanism 40. The second angled surface 44C of the second link 44 shown in FIG. 7B is provided separately from the first angled surface 44B, is continuous with the actuation pressing portion 44A and is formed so as to be angled up toward the side thereof at which the actuation pressing portion 44A is formed. The second angled surface 44C presses the actuated portion 28A of the microswitch 28 steadily in the final stage of the second operation of the contact/non-contact switching mechanism 40. Therefore, even with a relatively simple structure, the signal that is outputted from the microswitch 28 can be switched stably in the final stage of the second operation of the contact/non-contact switching mechanism 40.

Figure 9A:
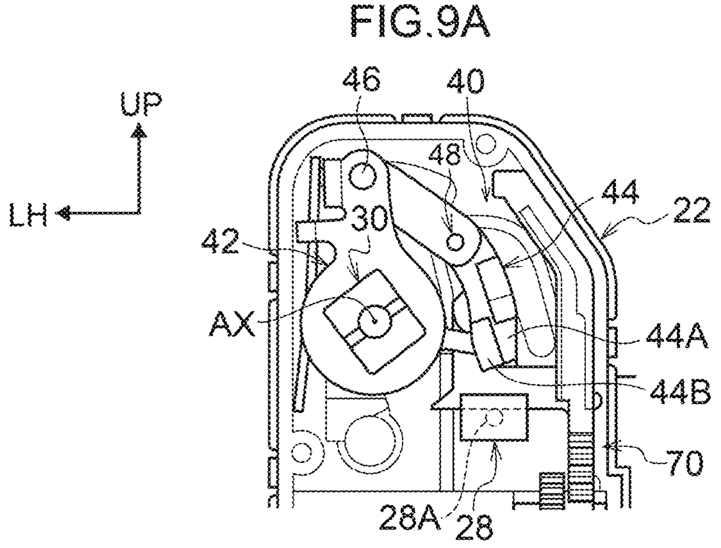
FIG. 9A is a view showing a state in which a portion of the interior of the fuel lid opener is seen from the opposite side from FIG. 8A when the fuel lid is in the open state.
Figure 9B:
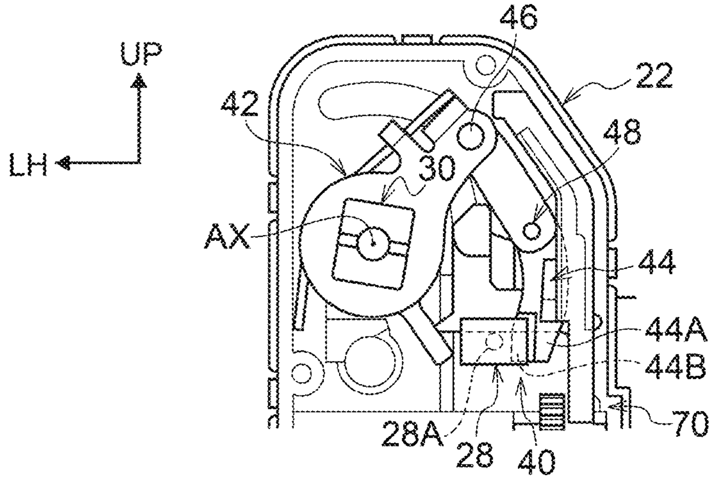
FIG. 9B is a view showing a state in which a portion of the interior of the fuel lid opener is seen from the opposite side from FIG. 8B when the fuel lid is in the pressed state.
Figure 9C:
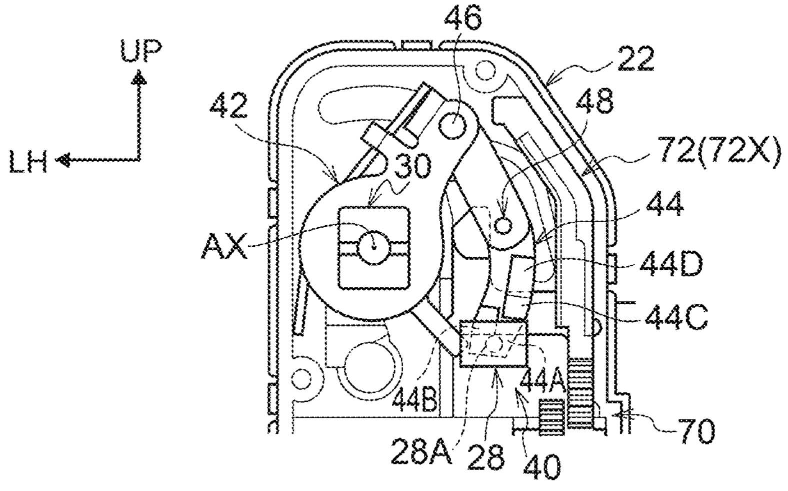
FIG. 9C is a view showing a state in which a portion of the interior of the fuel lid opener when the fuel lid is in the closed state is seen from the opposite side from FIG. 8C.
Figure 10A:
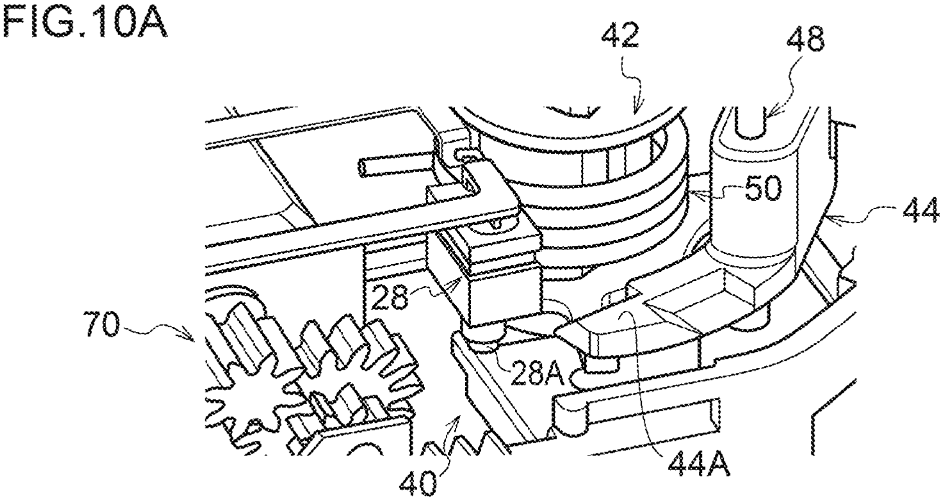
FIG. 10A is a perspective view of a portion of the interior of the fuel lid opener in the same state as in FIG. 9A.
Figure 10B:
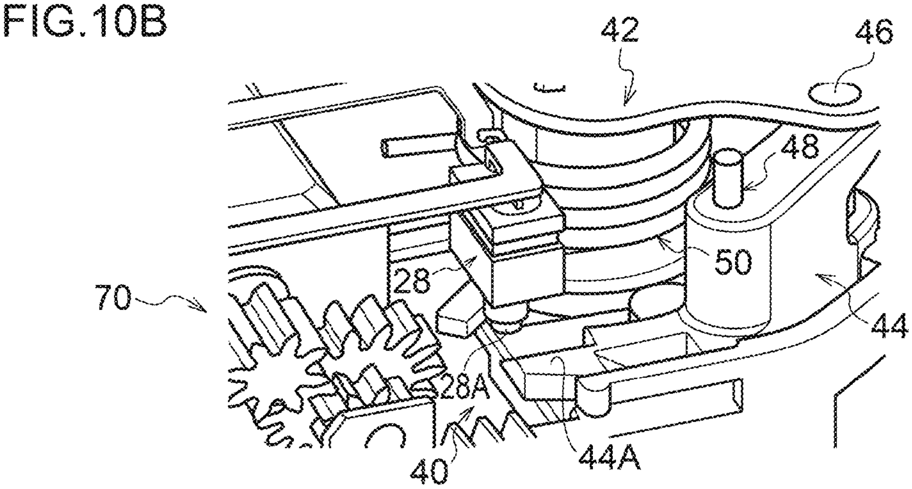
FIG. 10B is a perspective view of a portion of the interior of the fuel lid opener in the same state as in FIG. 9B.
Figure 10C:
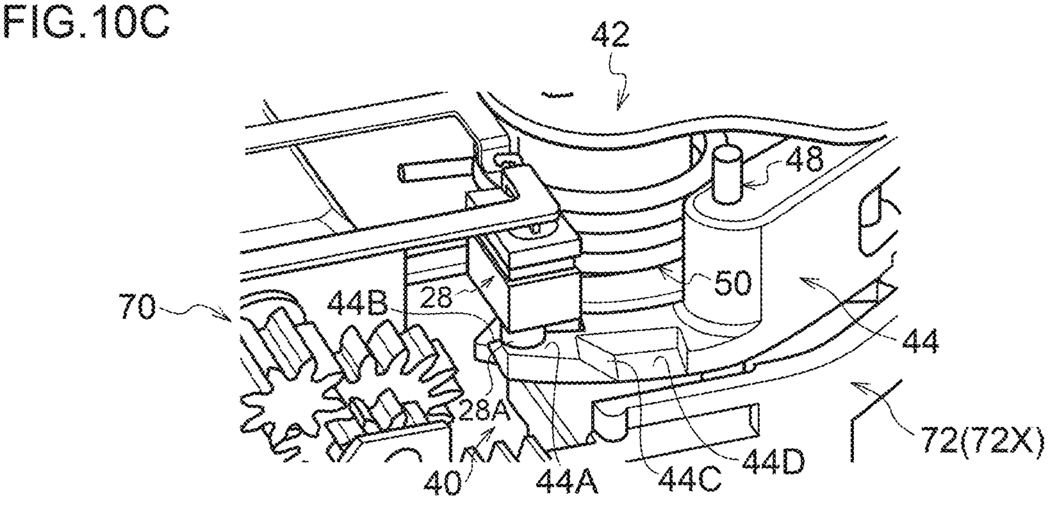
FIG. 10C is a perspective view of a portion of the interior of the fuel lid opener in the same state as in FIG. 9C.

In the present exemplary embodiment, when the actuated portion 28A of the microswitch 28 shown in FIG. 9C is pressed by the actuation pressing portion 44A, the catch surface 62A of the cam slot 52 in the non-recessed shape touches the guided portion 48A at the upper end side thereof as shown in FIG. 14. When the actuated portion 28A of the microswitch 28 is pressed by the actuation pressing portion 44A, the moving body 72 of the driving unit 70 shown in FIG. 7A and the like is movable between the restricting position 72X shown in FIG. 5A and the restriction release position 72Y shown in FIG. 5B. The restricting position 72X is a position of the moving body 72 that restricts operation of the second link 44, and the moving body 72 at the restriction release position 72Y releases the restriction. The moving body 72 is moved from the restricting position 72X to the restriction release position 72Y by operation of the motor 74 (see FIG. 3). As shown in FIG. 14, when the moving body 72 is disposed at the restricting position 72X and restricts operation of the second link 44, the stopper portion 72S of the moving body 72 is disposed at the vehicle width direction inner side relative to the guided portion 48A as seen in the direction along the axis line AX and the stopper portion 72S restricts movement of the guided portion 48A. When the moving body 72 is disposed at the restriction release position 72Y (see FIG. 5B), the stopper portion 72S of the moving body 72 is disposed at a position at which contact thereof with the guided portion 48A is disabled. When the moving body 72 moves from the restricting position 72X (see FIG. 14) to the restriction release position 72Y, the push-out portion 72P of the moving body 72 pushes out the second link 44 such that the guided portion 48A separates to the vehicle width direction inner side from the catch surface 62A of the cam slot 52.

Thus, when the fuel lid 14 is in the closed state and the actuated portion 28A of the microswitch 28 shown in FIG. 9C is pressed by the actuation pressing portion 44A, movement of the guided portion 48A may be securely restricted by the catch surface 62A and the stopper portion 72S, and when the moving body 72 is moved from the restricting position 72X to the restriction release position 72Y (see FIG. 12B) by the driving force of the motor 74 (see FIG. 3), the guided portion 48A may be easily separated from the catch surface 62A of the cam slot 52.

According to the fuel lid opener 20 of the present exemplary embodiment as described above, misoperation when the fuel lid 14 is push-operated from the open state slowly may be prevented.

In the exemplary embodiment described above, the switch portion is structured by the single microswitch 28 shown in FIG. 3 and the like. However, a structure may be employed in which the switch portion is structured by plural switch elements.

In the exemplary embodiment described above, the push lifter mechanism 38 includes the cam slot 52, the first link 42 and the second link 44. However, structures of the push lifter mechanism are not limited to this structure.

When the driving unit 70 operates in the exemplary embodiment described above, the lifter 30 is rotated by the urging force of the torsion spring 50 serving as the urging member after the guided portion 48A shown in FIG. 15 is separated from the catch surface 62A by the driving force of the driving unit 70. However, structures of the push lifter mechanism are not limited to this structure.

In the exemplary embodiment described above, the cam slot 52 includes the catch surface 62A with the non-recessed shape and the moving body 72 includes the stopper portion 72S. However, a structure may be employed in which a recessed catch surface with a recessed shape is specified instead of the non-recessed catch surface 62A and the stopper portion 72S is not provided.

In the exemplary embodiment described above, as shown in FIG. 6A and the like, the second link 44 includes the first angled surface 44B and the second angled surface 44C. However, structures of the second link are not limited to this structure.

In the exemplary embodiment described above, the control unit 80 shown in FIG. 3 operates the driving unit 70 when the signal outputted from the microswitch 28 switches from the OFF signal to the ON signal and the OFF signal in that order within the prescribed time and the control unit 80 determines that the initial OFF signal was outputted continuously for at least the reference time specified in advance. However, structures may be employed that omit the condition "determines that the initial OFF signal was outputted continuously for at least the reference time specified in advance."

The exemplary embodiment described above and the variant examples mentioned above may be embodied in suitable combinations.

Hereabove, examples of the present invention have been described. The present invention is not limited by these descriptions and it will be clear that numerous modifications beyond these descriptions may be embodied within a technical scope not departing from the gist of the invention.

The disclosures of Japanese Patent Application No. 2020-202902 filed Dec. 7, 2020 are incorporated into the present specification by reference in their entirety.

What is claimed is:

1. A fuel lid opener comprising:

a case attached to an outer periphery face of a side wall of a lid box, at which a fuel lid is rotatably supported for opening and closing;

a lifter that is supported at the case to be rotatable around an axis line along a plate surface direction of the fuel lid in a closed state thereof, wherein the lifter comprises an arm portion configured to:

extend in a rotation radius direction within the lid box, when an outer face side of the fuel lid is push-operated, receive a force that causes the lifter to rotate to one side around the axis line;

a push lifter mechanism provided in the case, comprising an urging member that urges the lifter to another side around the axis line, wherein:

when the fuel lid is in a pressed state that is pushed in further than the closed state, the urging member urges such that the fuel lid returns to a position thereof in the closed state, and when a driving unit operates, the push lifter mechanism causes the lifter to rotate to the other side around the axis line such that the lifter directly contacts and pushes the fuel lid to move the fuel lid toward an open state;

a contact/non-contact switching mechanism that is provided at the push lifter mechanism and is operated to move in and out of contact with an actuated portion of a switch portion by rotation of the lifter, the contact/non-contact switching mechanism configured to:

when the fuel lid goes from the open state to the closed state and the pressed state and then returns to the closed state, switch a signal outputted from the switch portion from a first signal to a second signal by performing a prescribed first operation, and when the fuel lid goes from the closed state to the pressed state and then returns to the closed state, switch the signal outputted from the switch portion from the second signal to the first signal and the second signal in that order by performing a prescribed second operation that is different from the first operation; and a control unit that, consequent to a condition at least of the signal outputted from the switch portion switching from the second signal to the first signal and the second signal in that order within a prescribed time, causes the driving unit to operate so as to rotate the lifter to the other side around the axis line.

2. The fuel lid opener according to claim 1, wherein:

the switch portion comprises a single microswitch disposed in a fixed state within the case, and the switch portion is configured such that a relative movement path of the actuated portion of the microswitch with respect to the contact/non-contact switching mechanism is different when the contact/non-contact switching mechanism performs the first operation and when the contact/non-contact switching mechanism performs the second operation.

3. The fuel lid opener according to claim 1, wherein the push lifter mechanism further comprises:

a cam slot provided in the case, a depth direction of the cam slot being a direction along the direction of the axis line;

a first link attached to the lifter; and a second link that is rotatably coupled to the first link around an axis parallel to the axis line, the second link including:

an actuation pressing portion in a flat surface shape, the actuation pressing portion pressing the actuated portion of the switch portion when the fuel lid is in the closed state, and a guided portion that is inserted into the cam slot and is movable along the cam slot.

4. The fuel lid opener according to claim 3, wherein the push lifter mechanism is configured such that, when the push lifter mechanism pushes the fuel lid via the lifter to open, the guided portion is disengaged by driving force of the driving unit from a position at which movement by urging force of the urging member is disabled, and the lifter is rotated to the other side around the axis line by the urging force of the urging member.

5. The fuel lid opener according to claim 3, wherein the second link further comprises:

a first angled surface that is continuous with the actuation pressing portion and is configured to:

be angled up toward a side thereof at which the actuation pressing portion is formed, and press the actuated portion of the switch portion steadily in a final stage of the first operation of the contact/non-contact switching mechanism; and a second angled surface that is provided separately from the first angled surface, is continuous with the actuation pressing portion and is configured to:

be angled up toward the side thereof at which the actuation pressing portion is formed, and press the actuated portion of the switch portion steadily in a final stage of the second operation of the contact/non-contact switching mechanism.

6. The fuel lid opener according to claim 3, wherein:

the cam slot includes a catch surface in a non-recessed shape, the catch surface touching the guided portion at one side in a direction orthogonal to the axis line when the actuated portion of the switch portion is pressed by the actuation pressing portion;

the driving unit includes a drive source and a moving body that, when the actuated portion of the switch portion is pressed by the actuation pressing portion, is movable between a restricting position and a restriction release position, the restricting position being a position at which the moving body restricts operation of the second link, the restriction release position being a position at which this restriction is released, and the moving body being moved from the restricting position to the restriction release position by operation of the drive source; and the moving body includes:

a stopper portion configured to:

when the moving body is disposed at the restricting position and restricts operation of the second link, be disposed at one side of the guided portion in a direction orthogonal to the side of the guided portion at which the catch surface is disposed as seen in a direction along the axis line, and the stopper portion restricting movement of the guided portion, and when the moving body is disposed at the restriction release position, be disposed at a position at which contact thereof with the guided portion is disabled; and a push-out portion configured to, when the moving body moves from the restricting position to the restriction release position, push out the second link such that the guided portion separates from the catch surface of the cam slot.

7. The fuel lid opener according to claim 1, wherein the control unit is configured to cause the driving unit to operate such that the lifter is rotated to the other side when the signal outputted from the switch portion switches from the second signal to the first signal and the second signal in that order within the prescribed time and the control unit determines that the initial second signal was outputted continuously for at least a reference time specified in advance.

8. A fuel lid opener comprising:

a case attached to an outer periphery face of a side wall of a lid box, at which a fuel lid is rotatably supported for opening and closing;

a lifter that is supported at the case to be rotatable around an axis line along a plate surface direction of the fuel lid in a closed state thereof, wherein the lifter comprises an arm portion configured to:

extend in a rotation radius direction within the lid box, when an outer face side of the fuel lid is push-operated, receive a force that causes the lifter to rotate to one side around the axis line;

a push lifter mechanism provided in the case, comprising an urging member that urges the lifter to another side around the axis line, wherein:

when the fuel lid is in a pressed state that is pushed in further than the closed state, the urging member urges such that the fuel lid returns to a position thereof in the closed state, and when a driving unit operates, the push lifter mechanism causes the lifter to rotate to the other side around the axis line and pushing the fuel lid to open;

a contact/non-contact switching mechanism that is provided at the push lifter mechanism and is operated to move in and out of contact with an actuated portion of a switch portion by rotation of the lifter, the contact/non-contact switching mechanism configured to:

when the fuel lid goes from an open state to the closed state and the pressed state and then returns to the closed state, switch a signal outputted from the switch portion from a first signal to a second signal by performing a prescribed first operation, and when the fuel lid goes from the closed state to the pressed state and then returns to the closed state, switch the signal outputted from the switch portion from the second signal to the first signal and the second signal in that order by performing a prescribed second operation that is different from the first operation; and a control unit that, consequent to a condition at least of the signal outputted from the switch portion switching from the second signal to the first signal and the second signal in that order within a prescribed time, causes the driving unit to operate so as to rotate the lifter to the other side around the axis line, wherein:

the switch portion comprises a single microswitch disposed in a fixed state within the case, and the switch portion is configured such that a relative movement path of the actuated portion of the microswitch with respect to the contact/non-contact switching mechanism is different when the contact/non-contact switching mechanism performs the first operation and when the contact/non-contact switching mechanism performs the second operation.

9. A fuel lid opener comprising:

a case attached to an outer periphery face of a side wall of a lid box, at which a fuel lid is rotatably supported for opening and closing;

a lifter that is supported at the case to be rotatable around an axis line along a plate surface direction of the fuel lid in a closed state thereof, wherein the lifter comprises an arm portion configured to:

extend in a rotation radius direction within the lid box, when an outer face side of the fuel lid is push-operated, receive a force that causes the lifter to rotate to one side around the axis line;

a push lifter mechanism provided in the case, comprising an urging member that urges the lifter to another side around the axis line, wherein:

when the fuel lid is in a pressed state that is pushed in further than the closed state, the urging member urges such that the fuel lid returns to a position thereof in the closed state, and when a driving unit operates, the push lifter mechanism causes the lifter to rotate to the other side around the axis line and pushing the fuel lid to open;

a contact/non-contact switching mechanism that is provided at the push lifter mechanism and is operated to move in and out of contact with an actuated portion of a switch portion by rotation of the lifter, the contact/non-contact switching mechanism configured to:

when the fuel lid goes from an open state to the closed state and the pressed state and then returns to the closed state, switch a signal outputted from the switch portion from a first signal to a second signal by performing a prescribed first operation, and when the fuel lid goes from the closed state to the pressed state and then returns to the closed state, switch the signal outputted from the switch portion from the second signal to the first signal and the second signal in that order by performing a prescribed second operation that is different from the first operation; and a control unit that, consequent to a condition at least of the signal outputted from the switch portion switching from the second signal to the first signal and the second signal in that order within a prescribed time, causes the driving unit to operate so as to rotate the lifter to the other side around the axis line, wherein the control unit is configured to cause the driving unit to operate such that the lifter is rotated to the other side when the signal outputted from the switch portion switches from the second signal to the first signal and the second signal in that order within the prescribed time and the control unit determines that the initial second signal was outputted continuously for at least a reference time specified in advance.

* * * * *